US012169093B2

(12) United States Patent
Yoon et al.

(10) Patent No.: US 12,169,093 B2
(45) **Date of Patent: *Dec. 17, 2024**

(54) REFRIGERATOR

(71) Applicant: SAMSUNG ELECTRONICS CO., LTD., Suwon-si (KR)

(72) Inventors: Seok Jun Yoon, Daegu (KR); Young Jae Song, Gwangju (KR); Seung Yong Yang, Gwangju (KR); Sung Sik Moon, Gwangju (KR); Ho June Jeon, Yongin-si (KR); Kyung Han Jeong, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/372,739

(22) Filed: Sep. 26, 2023

(65) Prior Publication Data

US 2024/0019195 A1 Jan. 18, 2024

Related U.S. Application Data

(63) Continuation of application No. 17/544,421, filed on Dec. 7, 2021, now Pat. No. 11,808,513, which is a (Continued)

(30) Foreign Application Priority Data

Jan. 7, 2014 (KR) ........................ 10-2014-0002011
Aug. 27, 2014 (KR) ........................ 10-2014-0112110

(51) Int. Cl.

| | |
|---|---|
| ***F25D 23/02*** | (2006.01) |
| ***E06B 7/18*** | (2006.01) |
| ***F25D 11/02*** | (2006.01) |

(52) U.S. Cl.
CPC .............. *F25D 23/028* (2013.01); *E06B 7/18* (2013.01); *F25D 11/02* (2013.01); *F25D 23/02* (2013.01); *F25D 2323/021* (2013.01)

(58) Field of Classification Search
CPC ..... F25D 23/028; F25D 2323/021; E06B 7/18
See application file for complete search history.

(56) References Cited

U.S. PATENT DOCUMENTS 5,411,328 A 5/1995 You
5,694,789 A 12/1997 Do
(Continued)

FOREIGN PATENT DOCUMENTS

CN 101236043 8/2008
CN 101416011 4/2009
(Continued)

OTHER PUBLICATIONS

Australian Notice of Acceptance for Patent Application Jan. 10, 2017 in corresponding Australian Patent Application No. 2015205112.
(Continued)

*Primary Examiner* — Daniel J Rohrhoff
(74) *Attorney, Agent, or Firm* — STAAS & HALSEY LLP

(57) ABSTRACT

Provided is a refrigerator which allows a pivoting bar to pivot to seal a gap between a pair of doors regardless of whether the door at which the pivoting bar is not installed between the pair of doors is open or closed. The refrigerator includes a guide device which induces the pivoting bar to pivot. Here, the guide device includes a rack that is moved forward and backward linearly depending on opening and closing of the second door and includes a second magnet built therein, a pinion gear engaged with the rack and pivoting when the rack is moved linearly, and a guide unit which includes a guide groove guiding a guide protrusion
(Continued)

and is engaged with the pinion gear to move linearly in a direction opposite to that of the rack to allow the pivoting bar to pivot when the pinion gear pivots.

8 Claims, 26 Drawing Sheets

Related U.S. Application Data continuation of application No. 16/895,586, filed on Jun. 8, 2020, now Pat. No. 11,226,151, which is a continuation of application No. 16/402,609, filed on May 3, 2019, now Pat. No. 10,690,394, which is a continuation of application No. 15/957,108, filed on Apr. 19, 2018, now Pat. No. 10,337,785, which is a continuation of application No. 15/423,004, filed on Feb. 2, 2017, now Pat. No. 9,982,936, which is a continuation of application No. 15/204,143, filed on Jul. 7, 2016, now Pat. No. 9,631,857, which is a continuation of application No. PCT/KR2015/000064, filed on Jan. 5, 2015.

(56) References Cited

U.S. PATENT DOCUMENTS

| | | | | |
|---|---|---|---|---|
| 7,008,032 | B2 | 3/2006 | Chekal et al. | |
| 8,167,389 | B2 | 5/2012 | Han | |
| 8,333,446 | B2 | 12/2012 | Kang | |
| 8,926,032 | B2 * | 1/2015 | Kuehl | F25D 21/14 312/401 |
| 9,163,870 | B2 | 10/2015 | Jeon | |
| 9,234,695 | B1 | 1/2016 | Dubina | |
| 9,631,857 | B2 * | 4/2017 | Yoon | F25D 23/02 |
| 9,982,936 | B2 * | 5/2018 | Yoon | F25D 23/02 |
| 10,337,785 | B2 * | 7/2019 | Yoon | F25D 23/028 |
| 10,690,394 | B2 * | 6/2020 | Yoon | E06B 7/18 |
| 11,226,151 | B2 * | 1/2022 | Yoon | F25D 11/02 |
| 11,808,513 | B2 * | 11/2023 | Yoon | F25D 11/02 |
| 2005/0046319 | A1 * | 3/2005 | Chekal | F25D 23/02 312/401 |
| 2008/0209812 | A1 | 9/2008 | Lancry | |
| 2009/0113927 | A1 | 5/2009 | Laible | |
| 2010/0071404 | A1 * | 3/2010 | Han | F25D 23/02 62/449 |
| 2012/0235551 | A1 | 9/2012 | Park | |
| 2014/0097733 | A1 | 4/2014 | Seo | |
| 2014/0159560 | A1 * | 6/2014 | Jung | F25D 23/02 312/405 |
| 2014/0375198 | A1 * | 12/2014 | Jeon | F25D 25/02 312/405 |
| 2015/0015133 | A1 | 1/2015 | Carbajal | |
| 2017/0146283 | A1 | 5/2017 | Yoon | |
| 2017/0191738 | A1 * | 7/2017 | Jung | E05C 19/16 |
| 2018/0119475 | A1 * | 5/2018 | Kim | F25D 23/028 |
| 2019/0024967 | A1 * | 1/2019 | Lee | F25D 23/028 |
| 2019/0162006 | A1 | 5/2019 | Lee | |

FOREIGN PATENT DOCUMENTS

| | | |
|---|---|---|
| CN | 102235796 A | 11/2011 |
| CN | 103307840 | 9/2013 |
| EP | 3093591 | 11/2016 |
| JP | 2-106685 | 4/1990 |
| JP | H08170871 | 7/1996 |
| JP | 2755867 | 5/1998 |
| JP | 2005-156106 | 6/2005 |
| JP | 2013-100941 | 5/2013 |
| JP | 2013-108706 | 6/2013 |
| KR | 10-2006-0125273 | 12/2006 |
| KR | 10-2007-0111856 | 11/2007 |
| KR | 10-2008-0111165 | 12/2008 |
| KR | 10-2009-0133023 | 12/2009 |
| KR | 10-2010-0035095 | 4/2010 |
| KR | 10-2010-0118434 | 11/2010 |
| KR | 10-2012-0048426 | 5/2012 |
| KR | 10-2012-0106098 | 9/2012 |
| KR | 10-2013-0105065 | 9/2013 |
| KR | 10-1341569 | 12/2013 |
| KR | 10-2473752 | 12/2022 |
| WO | 2012/123035 | 9/2012 |

OTHER PUBLICATIONS

International Search Report mailed Apr. 10, 2015 in corresponding International Application No. PCT/KR2015/000064.
Written Opinion mailed Apr. 10, 2015 in corresponding International Application No. PCT/KR2015/000064.
Notice of Allowance issued in copending U.S. Appl. No. 15/204,143 on Dec. 12, 2016.
Notice of Allowance issued in copending Canadian Patent Application No. 2,936,057 on May 4, 2017.
Search Report issued in copending European Patent Application No. 15735206.3-1605 on May 4, 2017.
Chinese Office Action dated Mar. 23, 2018 in Chinese Patent Application No. 201580012593.6.
U.S. Notice of Allowance dated Jan. 19, 2018 in U.S. Appl. No. 15/423,004.
U.S. Notice of Allowance dated Sep. 18, 2017 in U.S. Appl. No. 15/423,004.
U.S. Notice of Allowance dated Jun. 9, 2017 ins U.S. Appl. No. 15/423,004.
U.S. Office Action dated Oct. 14, 2016 in U.S. Appl. No. 15/204,143.
U.S. Corrected Notice of Allowance dated Feb. 9, 2017 in U.S. Appl. No. 15/204,143.
U.S. Corrected Notice of Allowance dated Sep. 14, 2017 is U.S. Appl. No. 15/423,004.
U.S. Corrected Notice of Allowance dated Aug. 3, 2017 in U.S. Appl. No. 15/423,004.
U.S. Corrected Notice of Allowance dated Feb. 28, 2018 in U.S. Appl. No. 15/423,004.
Australian Office Action dated Aug. 3, 2018 in Australian Patent Application No. 2017202514.
Australian Notice of Acceptance dated Nov. 30, 2018 in Australian Patent Application No. 2017202514.
Chinese Office Action dated Oct. 24, 2018 in Chinese Patent Application No. 201580012593.6.
European Communication dated Jan. 30, 2019 in European Patent Application No. 15735206.3.
Chinese Notice of Allowance dated Apr. 9, 2019 in Chinese Patent Application No. 201580012593.6.
U.S. Office Action dated Oct. 5, 2018 in U.S. Appl. No. 15/957,108.
U.S. Notice of Allowance dated Feb. 6, 2019 in U.S. Appl. No. 15/957,108.
Korean Office Action dated Oct. 21, 2019 in Korean Patent Application No. 10-2014-0112110.
Extended European Search Report dated Jan. 17, 2020 in European Patent Application No. 19201038.7.
U.S. Office Action dated Sep. 16, 2019 in U.S. Appl. No. 16/402,609.
U.S. Office Action dated Dec. 26, 2019 in U.S. Appl. No. 16/402,609.
U.S. Notice of Allowance dated Feb. 14, 2020 in U.S. Appl. No. 16/402,609.
Korean Office Action dated Jun. 18, 2020 in Korean Patent Application No. 10-2020-0047444.
Chinese Office Action dated Sep. 1, 2020 in Chinese Patent Application No. 201910548980.1.
Chinese Office Action dated Sep. 1, 2020 in Chinese Patent Application No. 201910548689.4.
Extended European Search Report dated Feb. 3, 2021 in European Patent Application No. 20204605.8.
Korean Office Action for Korean Patent Application No. 10-2021-0078033 dated Aug. 5, 2021.
European Office Action for European Patent Application No. 20 204 605.8 dated Aug. 20, 2021.
U.S. Office Action issued in U.S. Appl. No. 16/895,586 dated Jun. 1, 2021.

(56) References Cited

OTHER PUBLICATIONS

U.S. Notice of Allowance issued in U.S. Appl. No. 16/895,586 dated Sep. 10, 2021.
U.S. Corrected Notice of Allowance issued in U.S. Appl. No. 16/895,586 dated Nov. 15, 2021.
European Office Action dated Jan. 7, 2022 in European Patent Application No. 20 204 605.8 (63 pages).
Korean Notice of Patent Allowance dated Feb. 3, 2022 in related Korean Patent Application No. 10-2021-0078033 (2 pages, 1 page English translation).
European Office Action dated Mar. 29, 2022 in European Patent Application No. 20 204 605.8.
Office Action dated Sep. 21, 2023 in U.S. Appl. No. 17/544,421.
Korean Notice of Allowance dated Aug. 31, 2022 in Korean Patent Application No. 10-2022-0054322 (2 pages; 1 page English translation).
European Notice of Allowance dated Oct. 19, 2022 in European Patent Application No. 20 204 605.8 (62 pages).
Office Action dated Dec. 16, 2022 in Korean Patent Application No. 10-2022-0163278 (3 pages; 1 page English translation).
Final Office Action dated Apr. 6, 2023 in U.S. Appl. No. 17/544,421.
Notice of Allowance dated Jun. 27, 2023 in U.S. Appl. No. 17/544,421.
Extended European Search Report dated May 11, 2023 in European Patent Application No. 23157623.2.
Notice of Allowance dated Jul. 25, 2023 in Korean Patent Application No. 10-2020-0163278.
Corrected Notice of Allowance dated Aug. 14, 2023 in U.S. Appl. No. 17/544,421.
U.S. Appl. No. 17/544,421, filed Dec. 7, 2021, Seok Jun Yoon et al., Samsung Electronics Co., Ltd.
U.S. Appl. No. 16/895,586 (now U.S. Pat. No. 11,226,151), filed Jun. 8, 2020, Seok Jun Yoon et al., Samsung Electronics Co., Ltd.
U.S. Appl. No. 16/402,609 (now U.S. Pat. No. 10,690,394), filed May 3, 2019, Seok Jun Yoon et al., Samsung Electronics Co., Ltd.
U.S. Appl. No. 15/957,108 (now U.S. Pat. No. 10,337,785), filed Apr. 19, 2018, Seok Jun Yoon et al., Samsung Electronics Co., Ltd.
U.S. Appl. No. 15/423,004 (now U.S. Pat. No. 9,982,936), filed Feb. 2, 2017, Seok Jun Yoon et al., Samsung Electronics Co., Ltd.
U.S. Appl. No. 15/204,143 (now U.S. Pat. No. 9,631,857), filed Jul. 7, 2016, Seok Jun Yoon et al., Samsung Electronics Co., Ltd.

* cited by examiner

[Fig. 1]
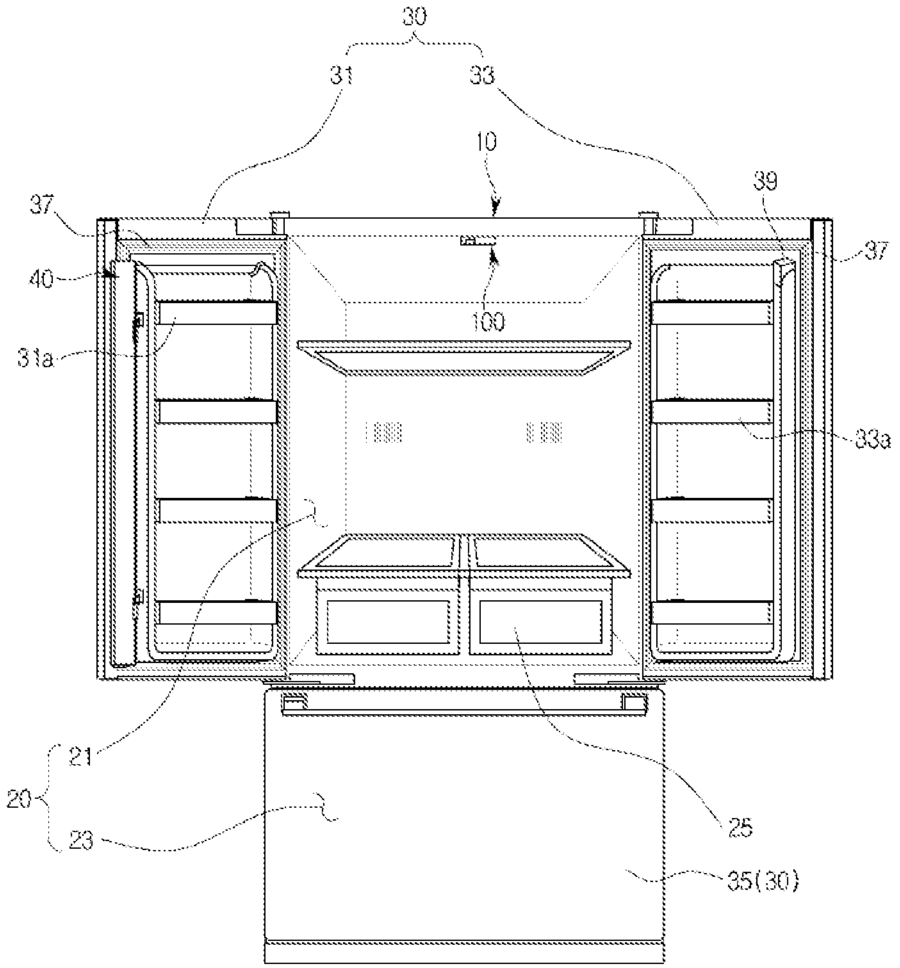

[Fig. 2]
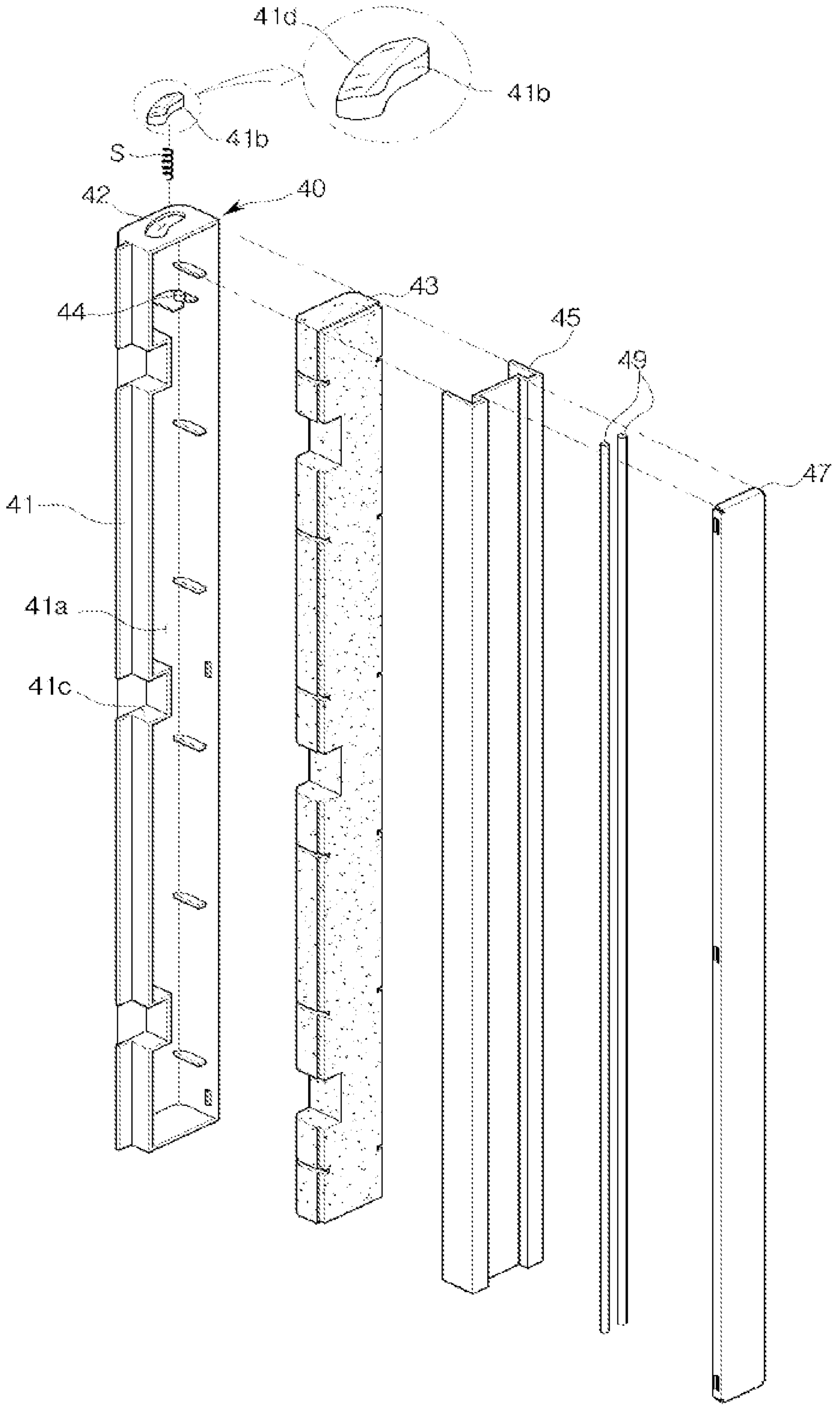

[Fig. 3]
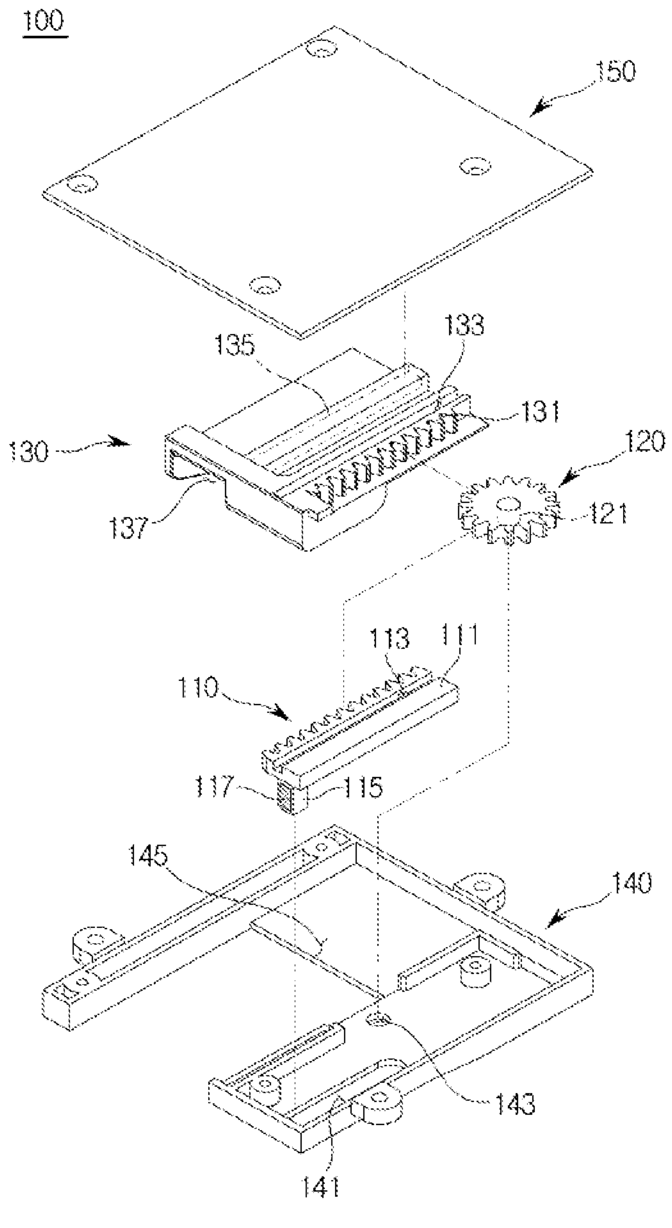

[Fig. 4]
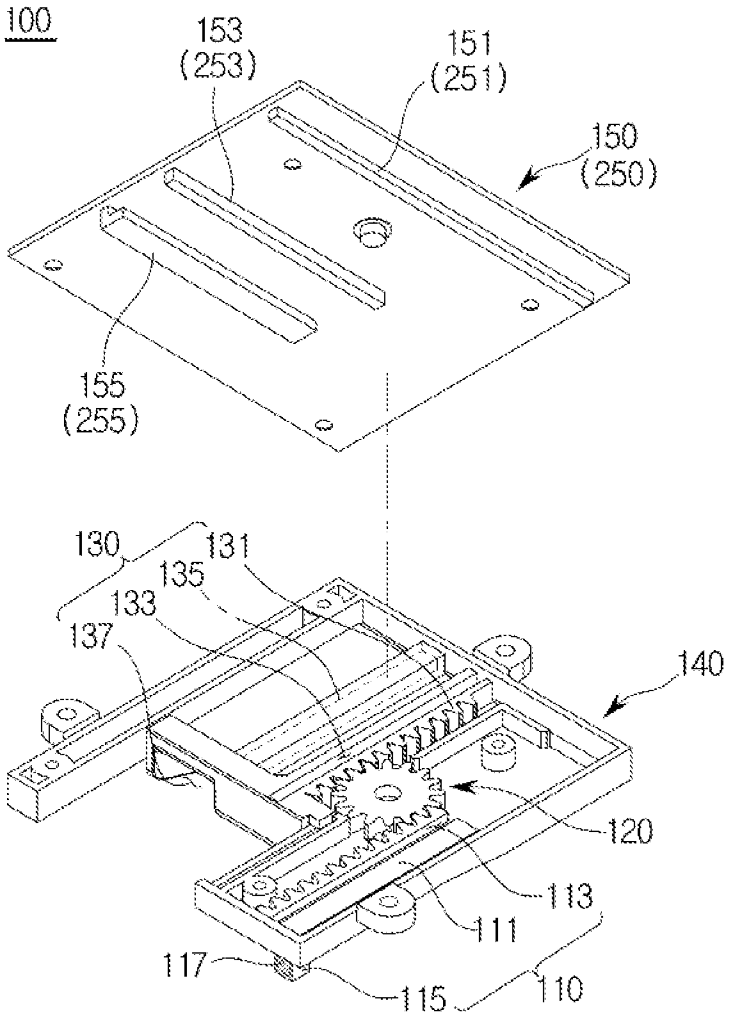

[Fig. 5]
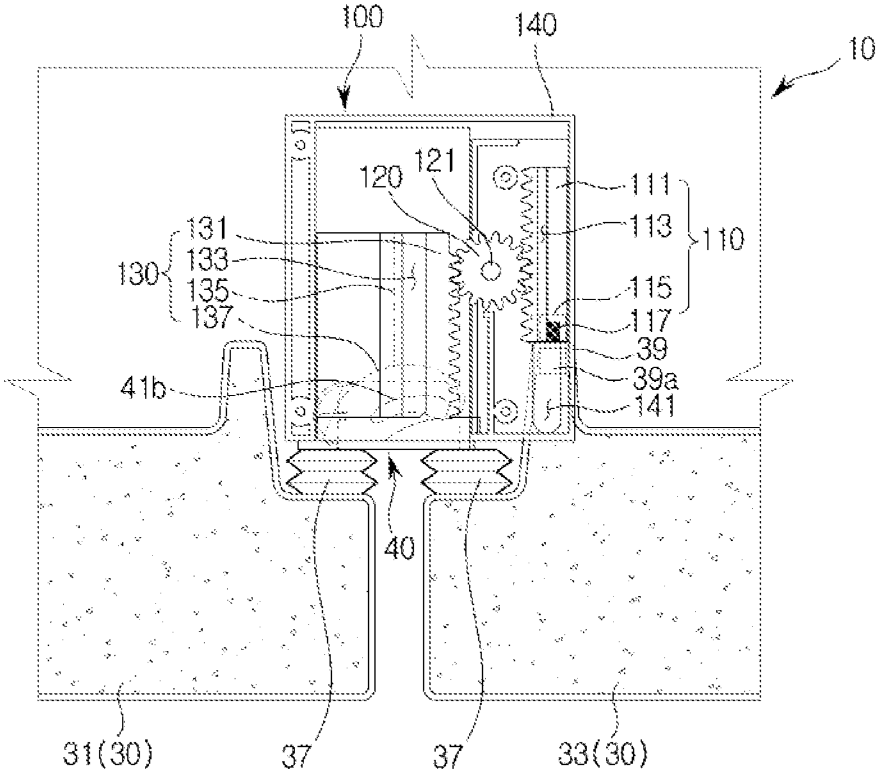

[Fig. 6]
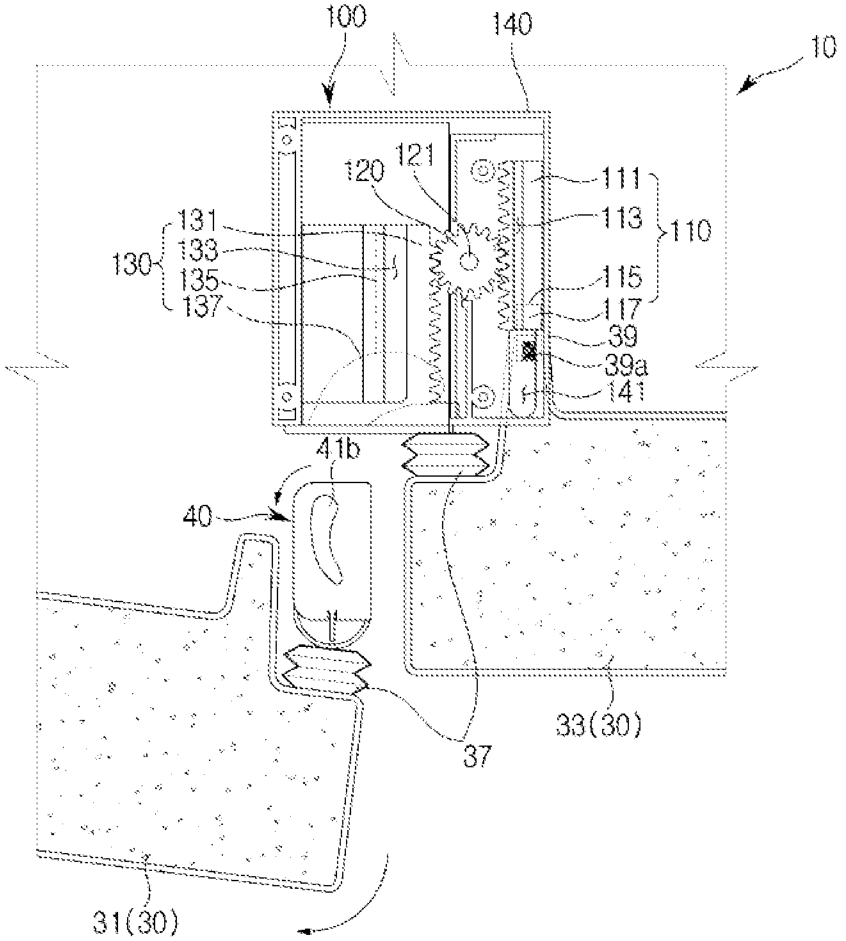

[Fig. 7]
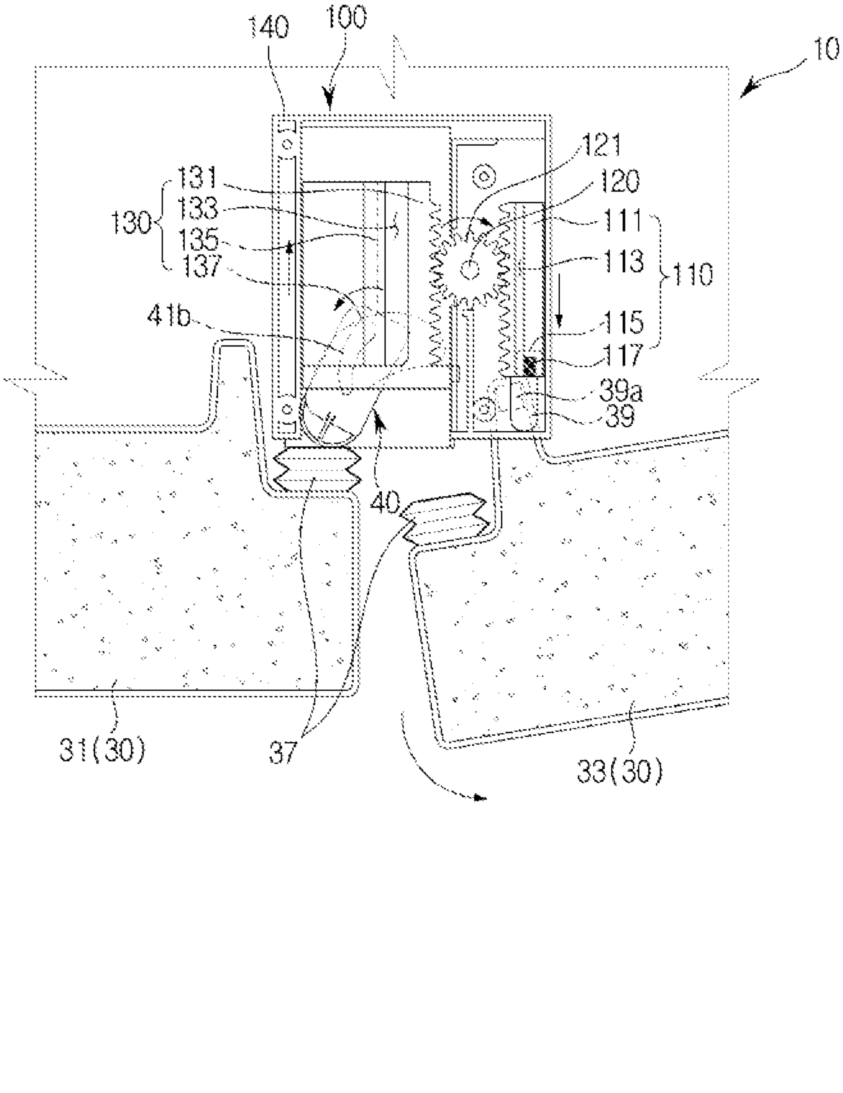

[Fig. 8]
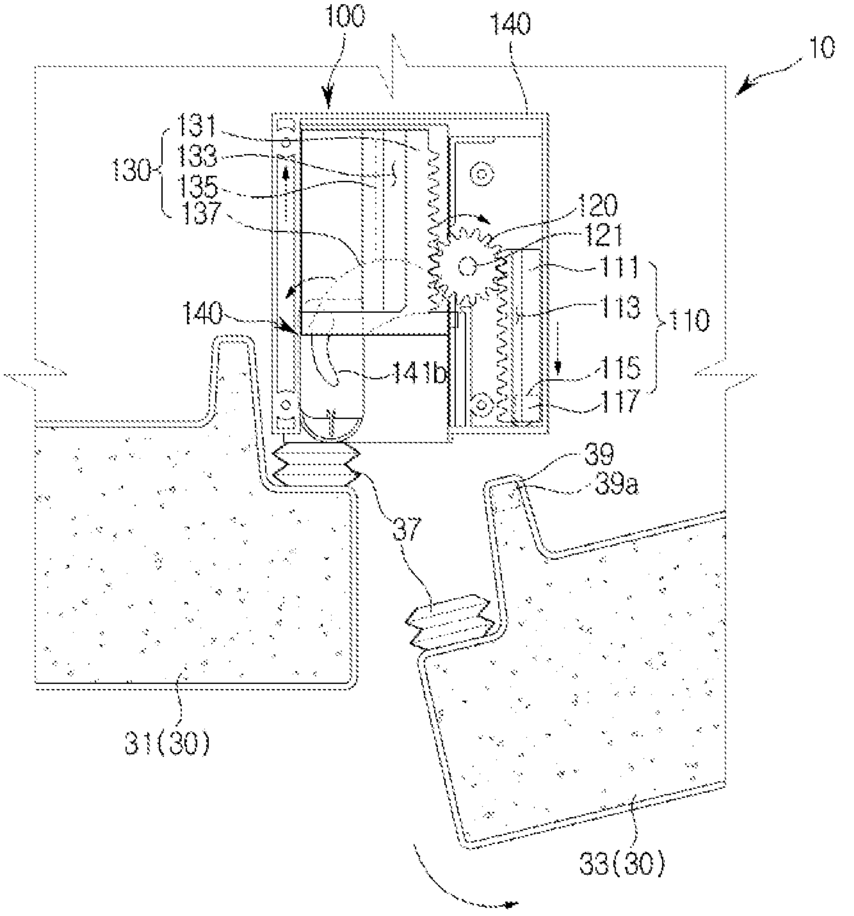

[Fig. 9]
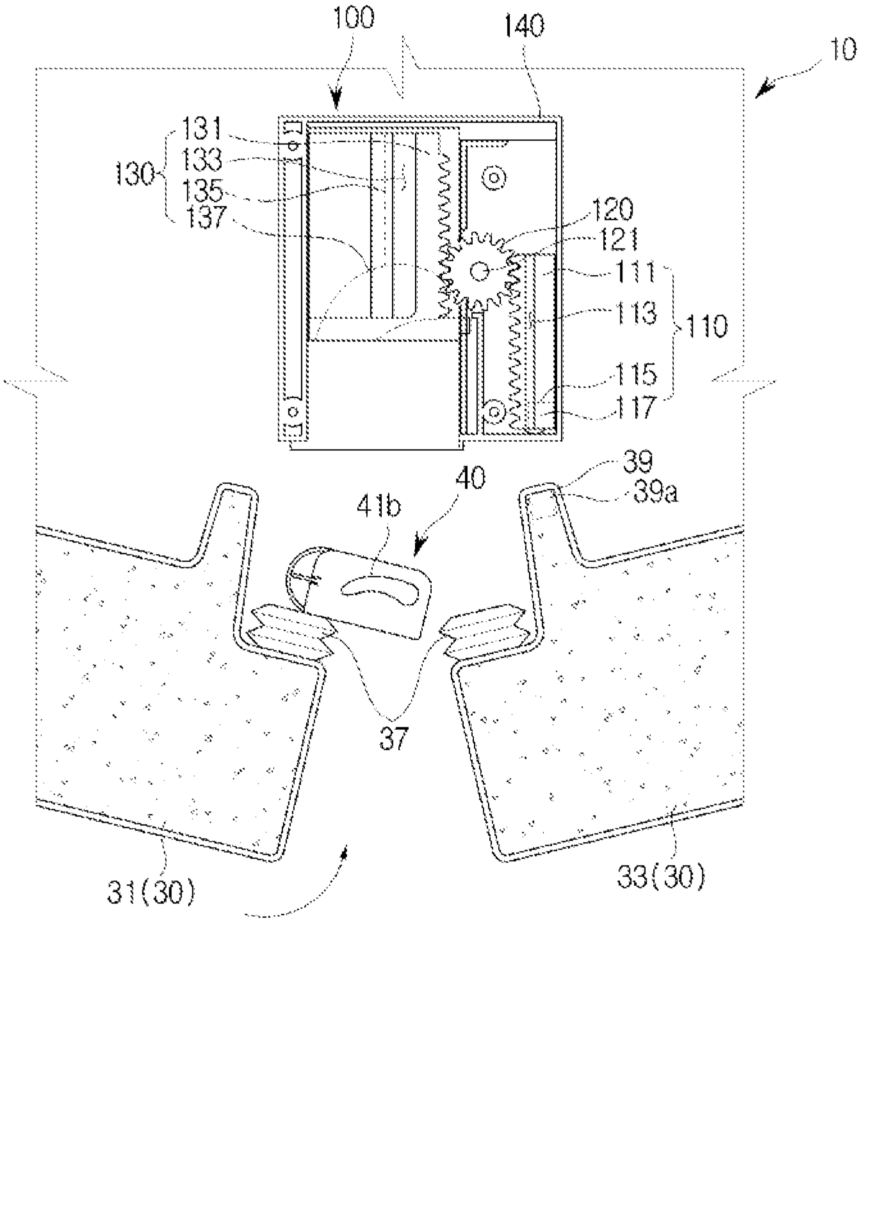

[Fig. 10]
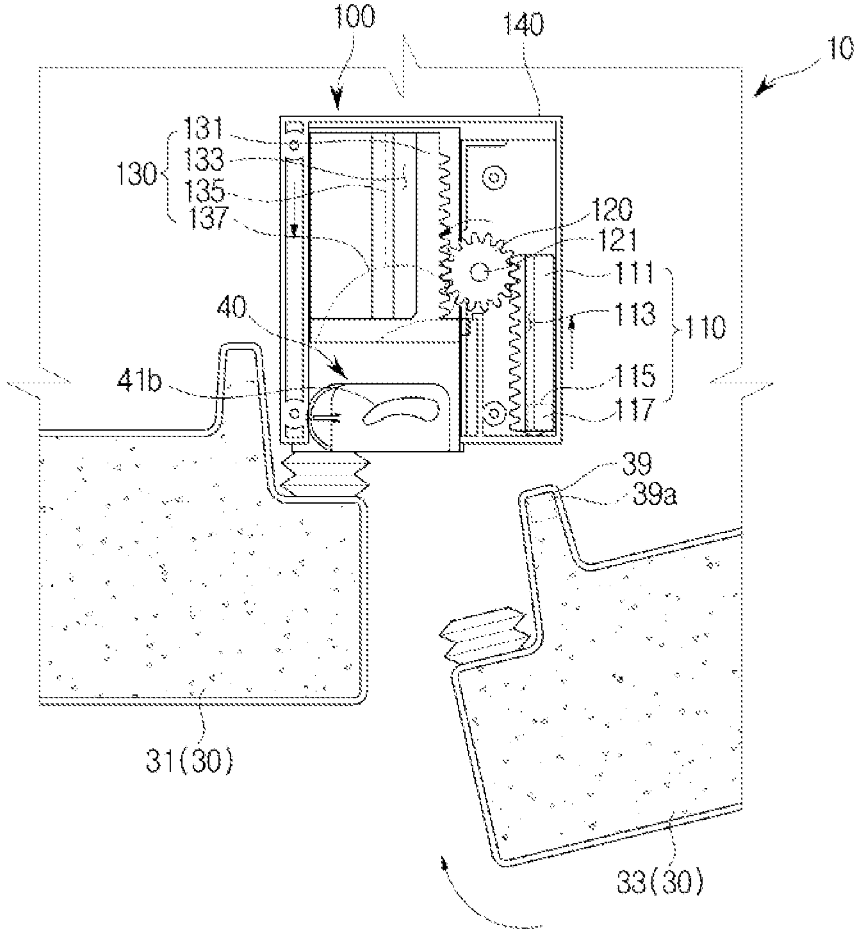

[Fig. 11]
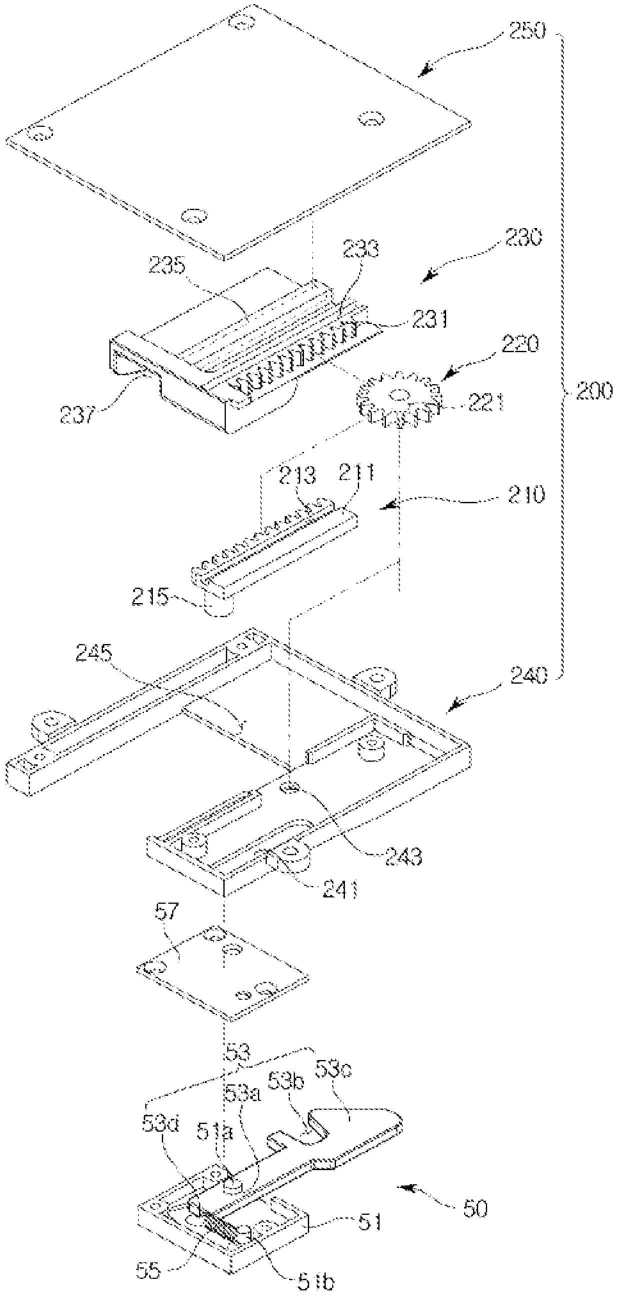

[Fig. 12]
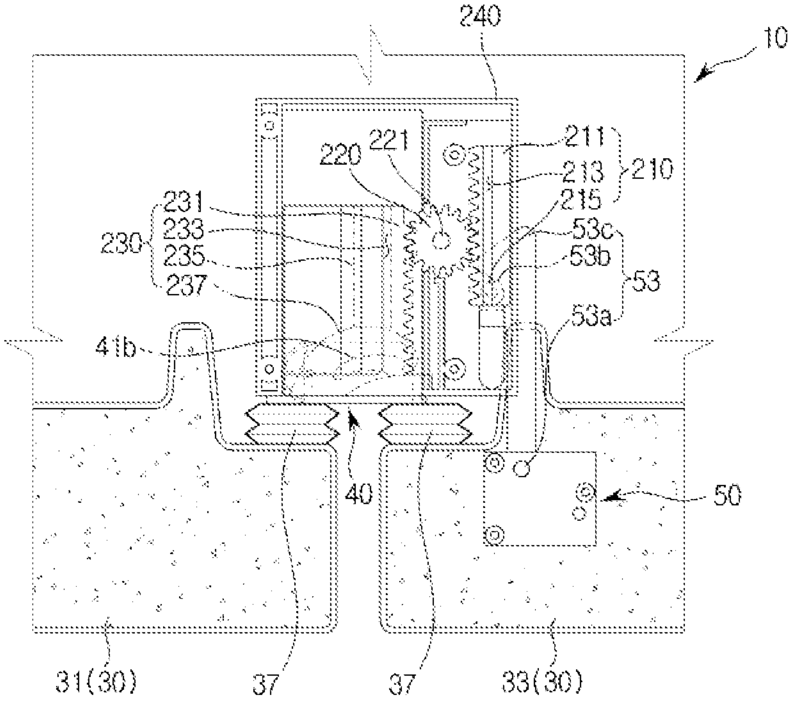
[Fig. 13]
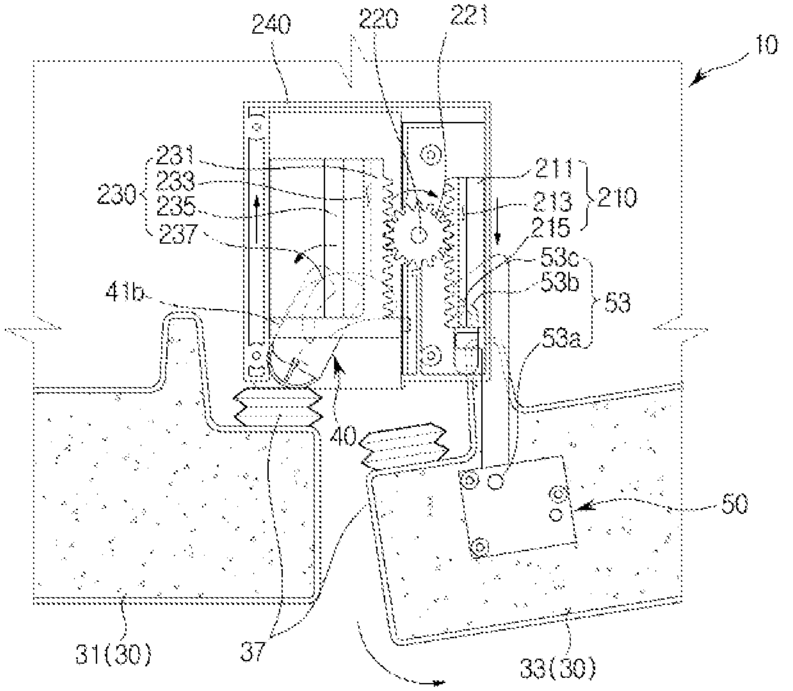

[Fig. 14]
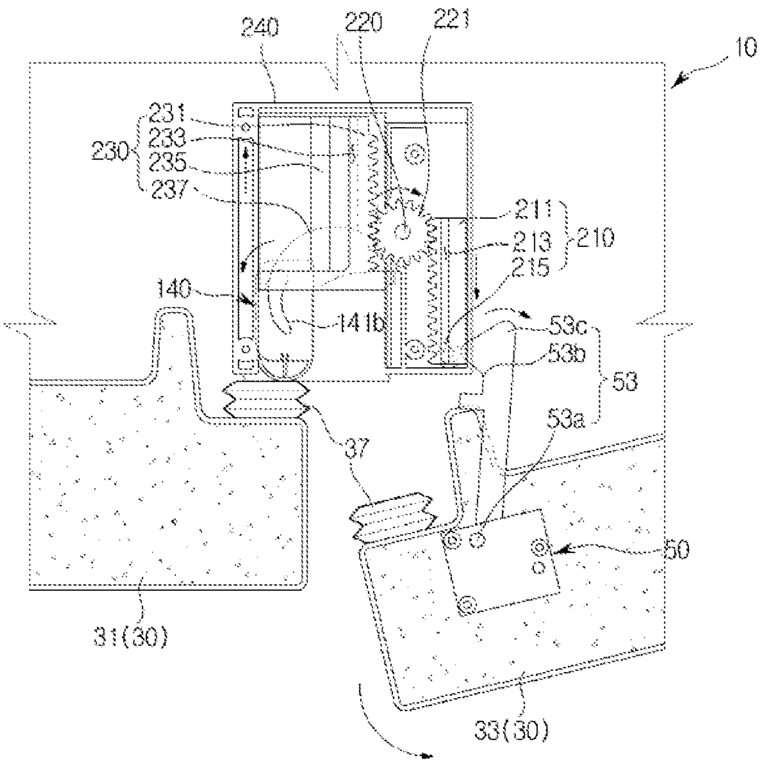
[Fig. 15]
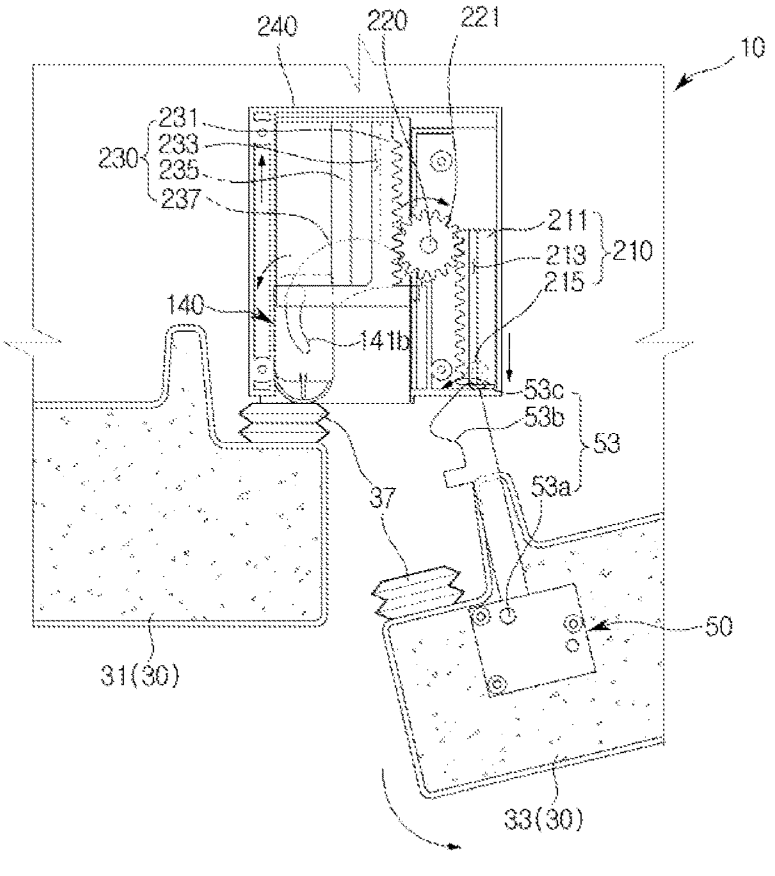

[Fig. 16]
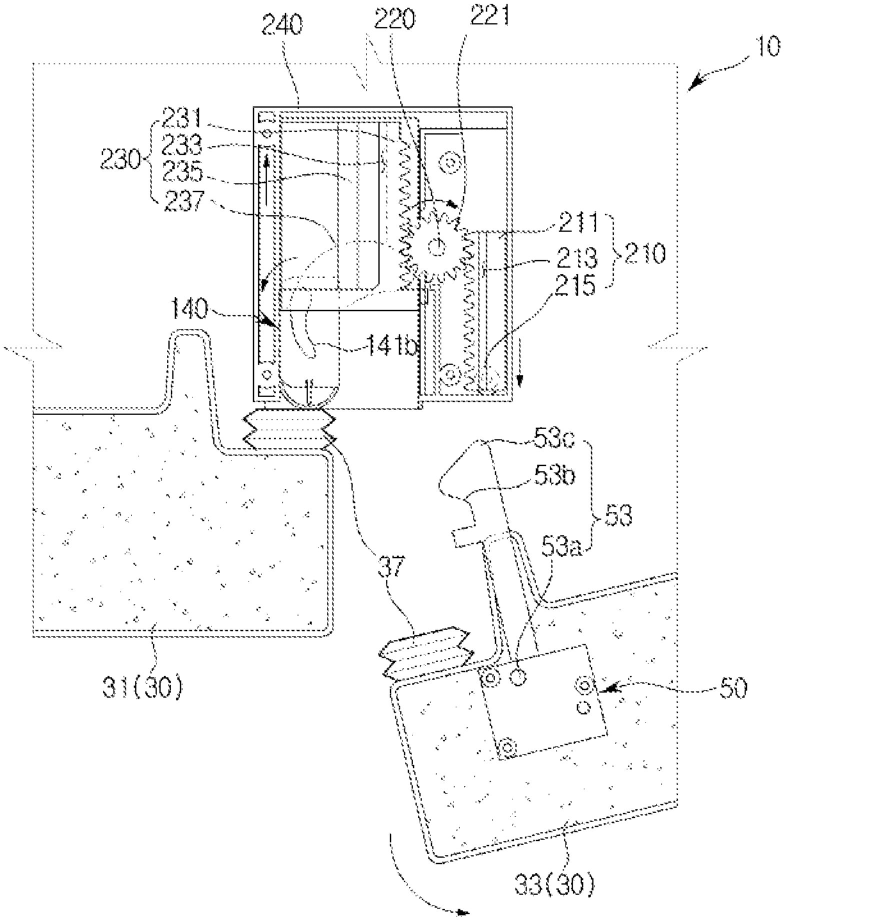
[Fig. 17]
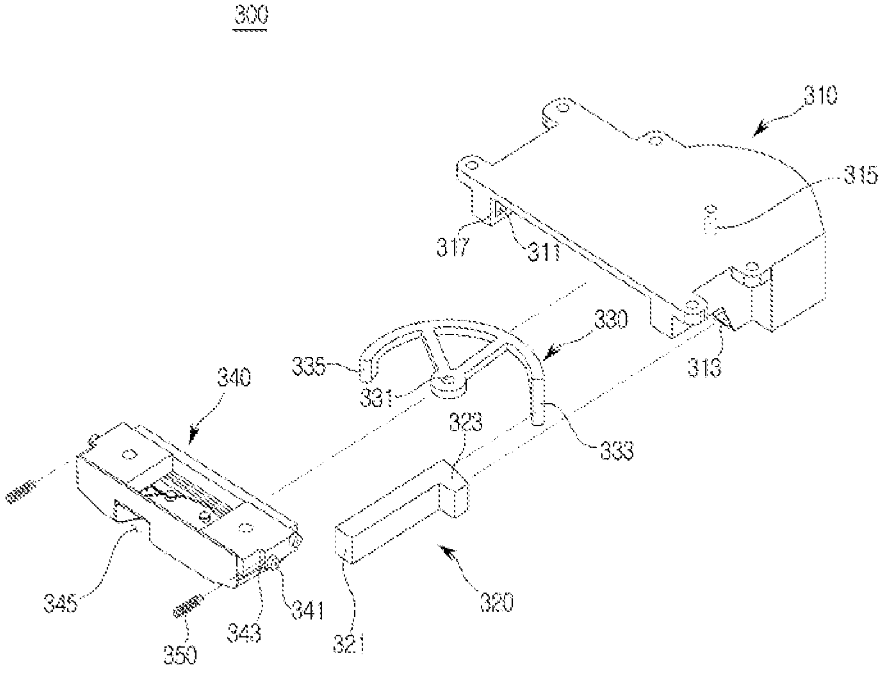

[Fig. 18]
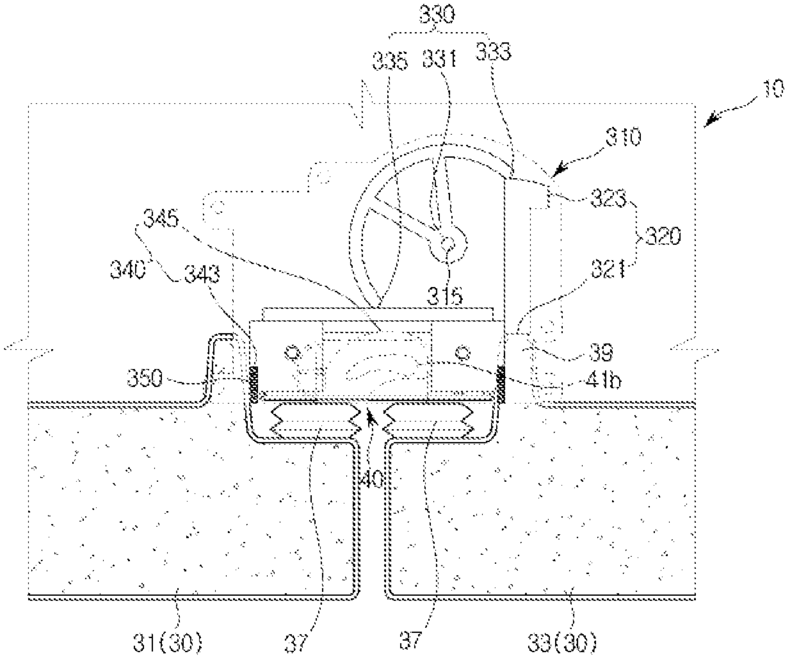
[Fig. 19]
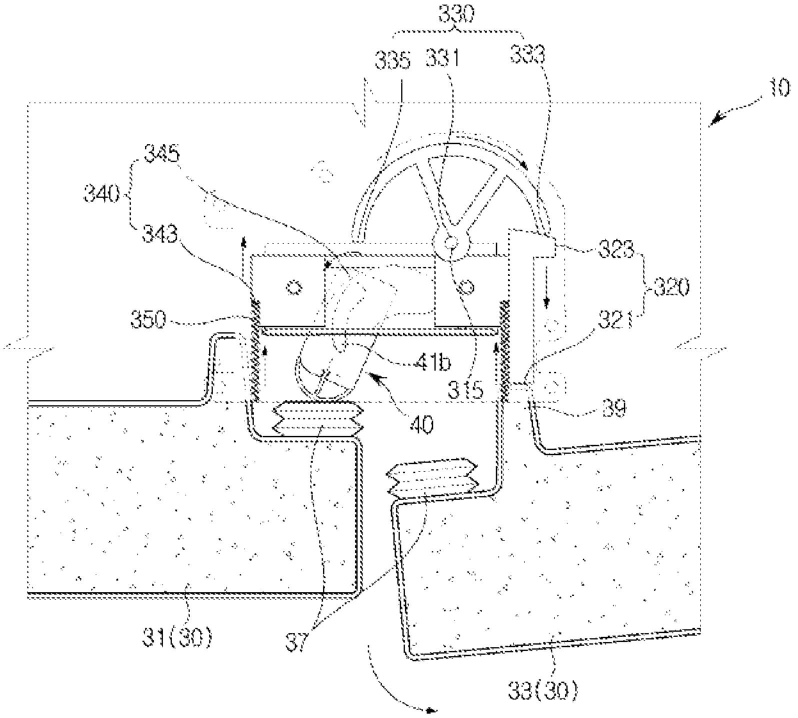

[Fig. 20]
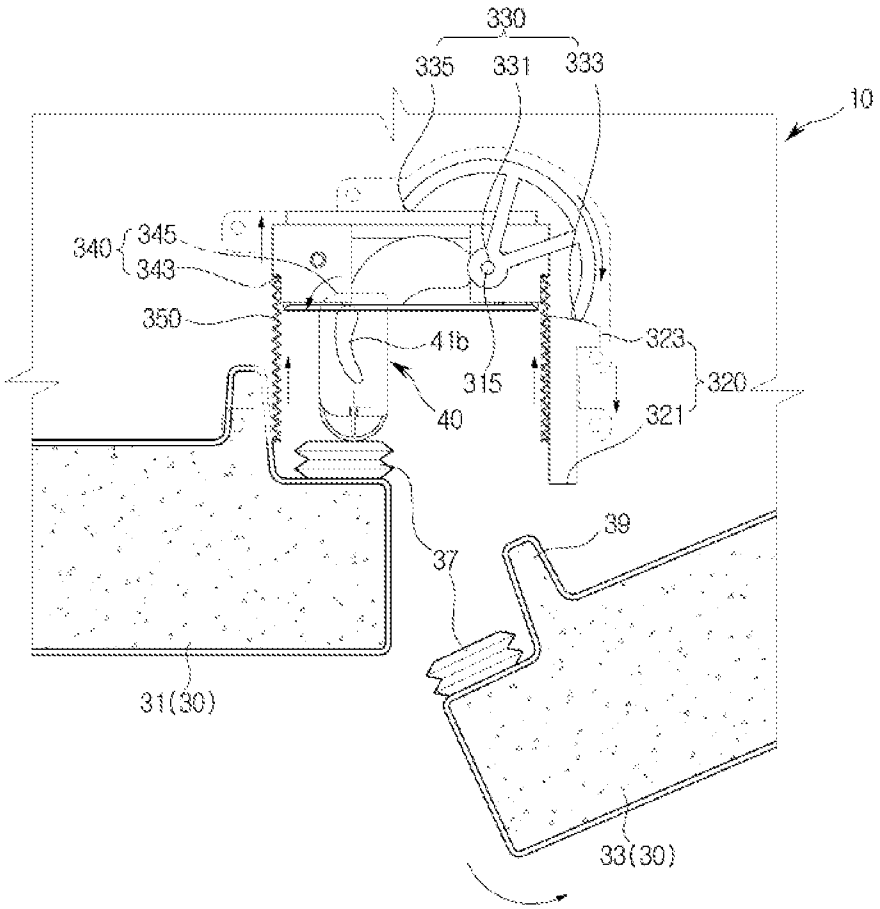

[Fig. 21]
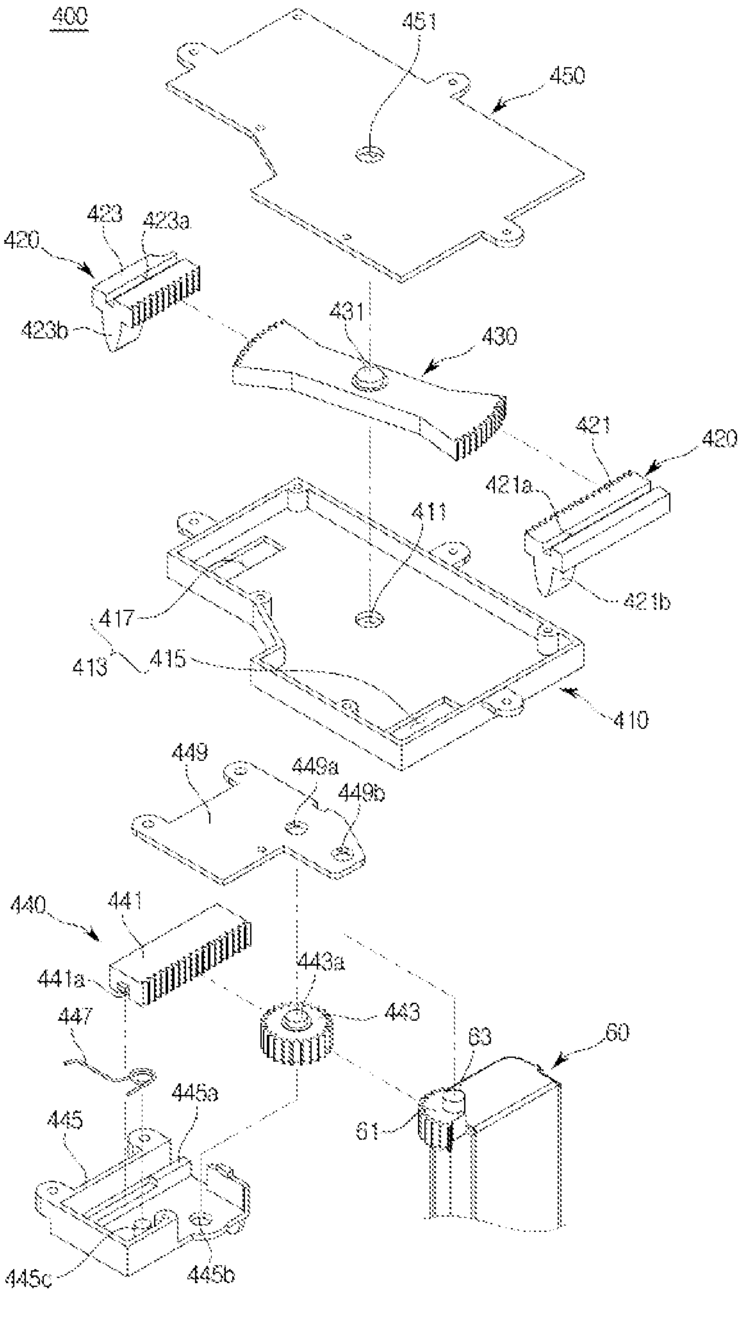

[Fig. 22]
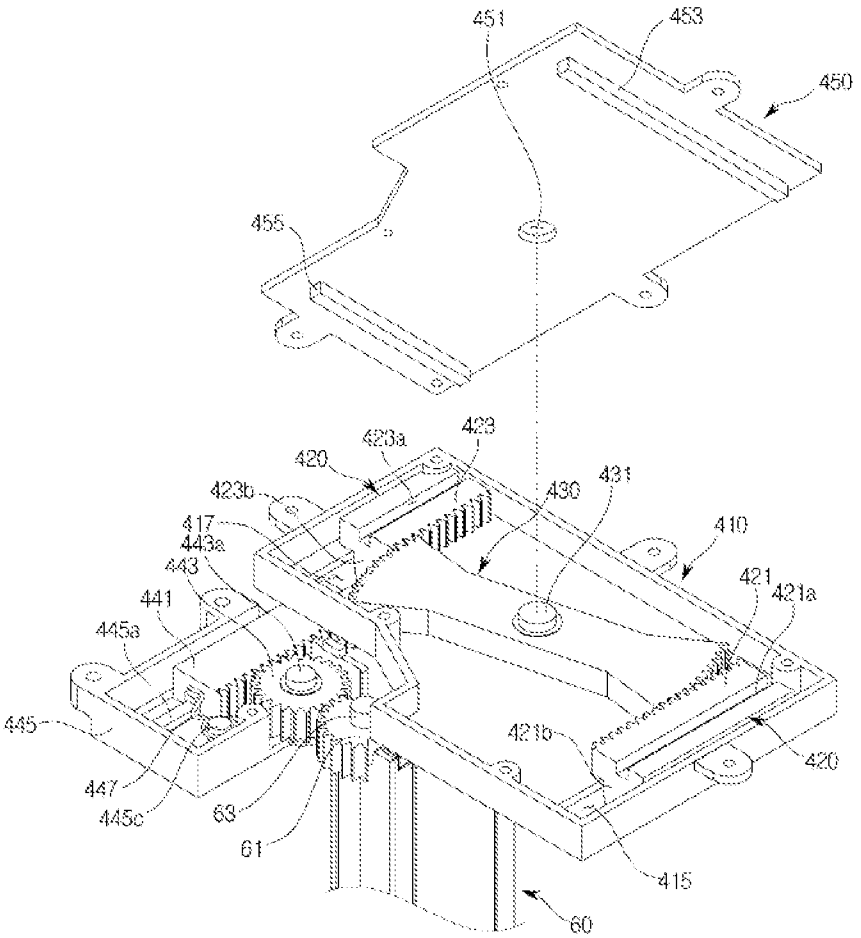
[Fig. 23]
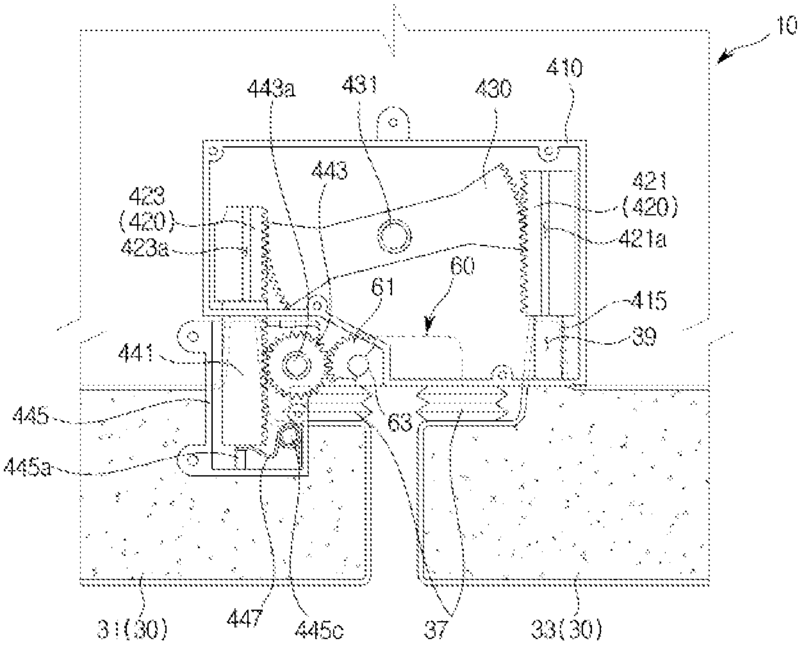

[Fig. 24]
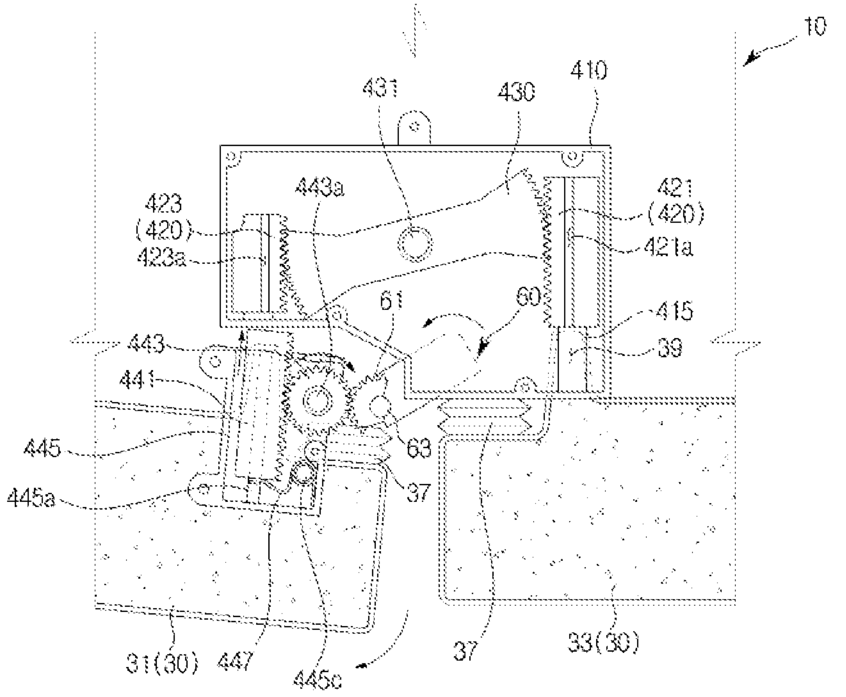
[Fig. 25]
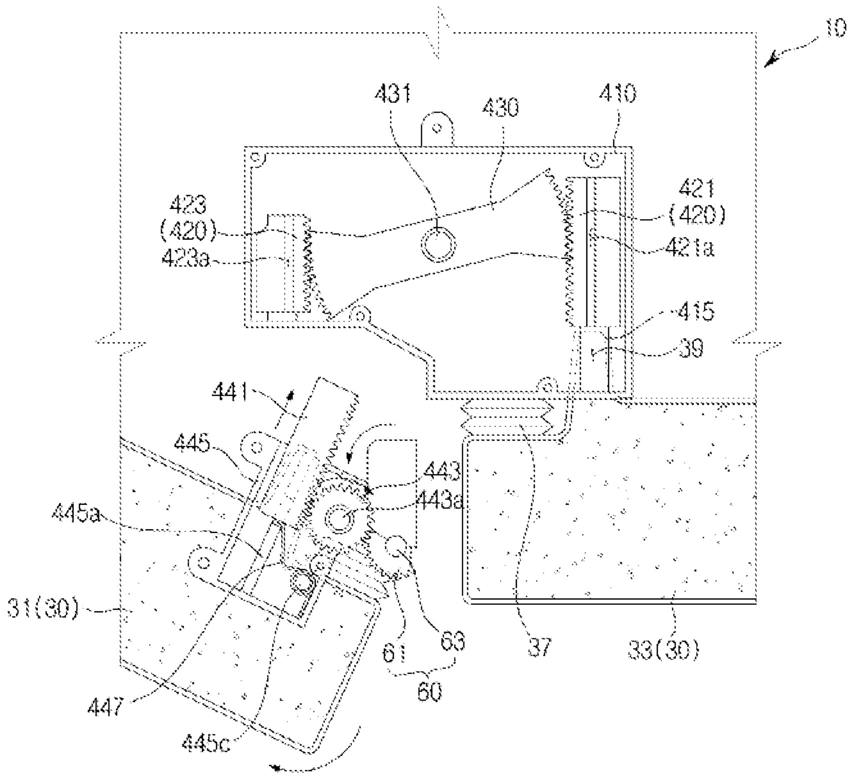

[Fig. 26]
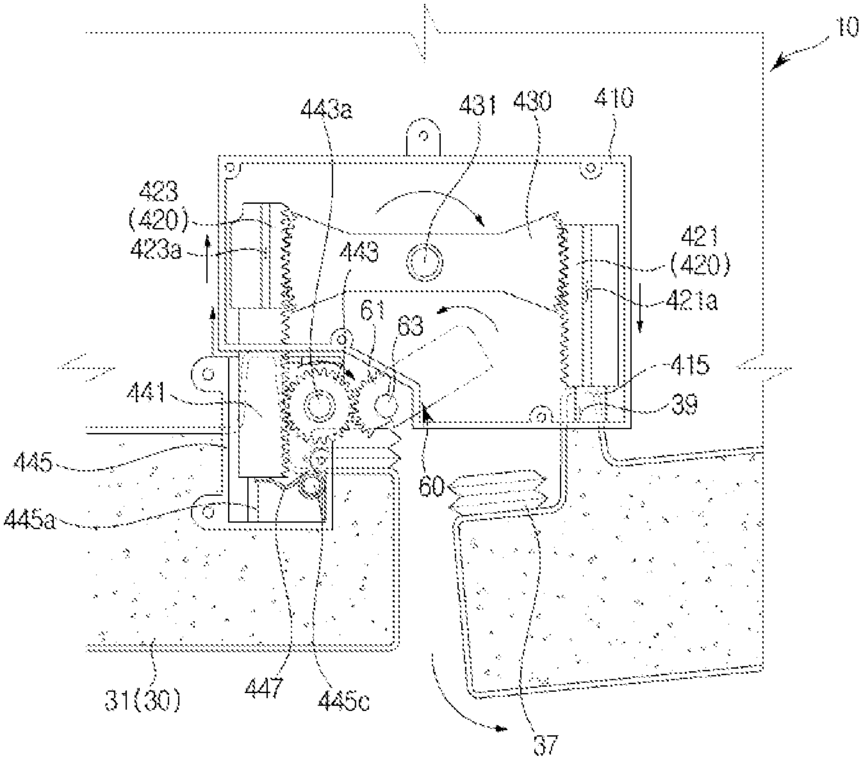
[Fig. 27]
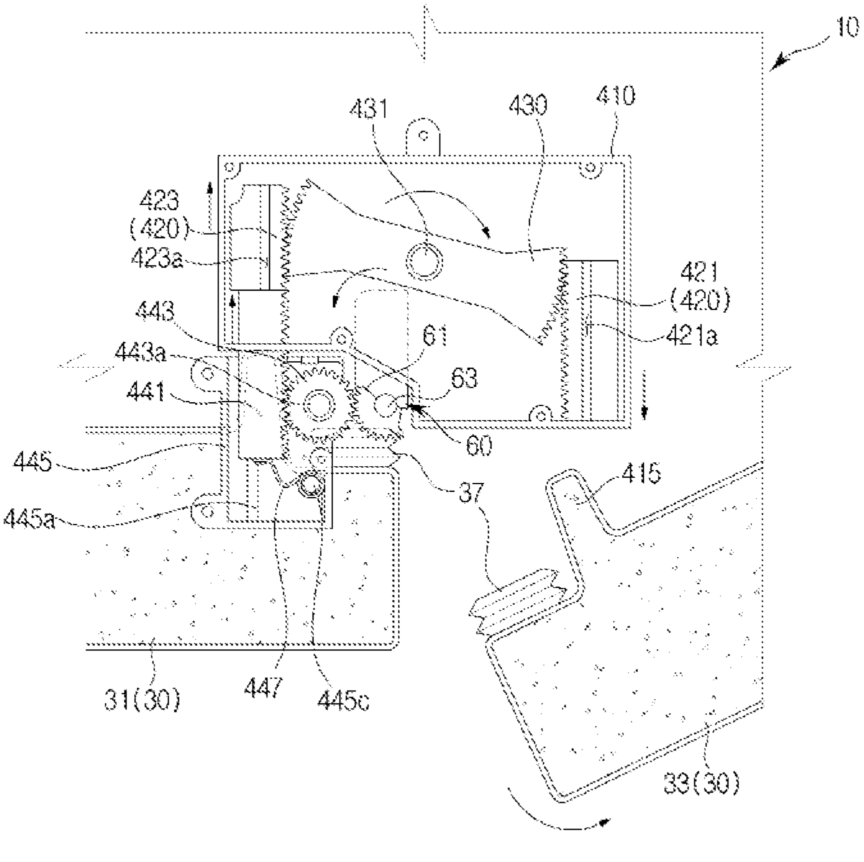

[Fig. 28]
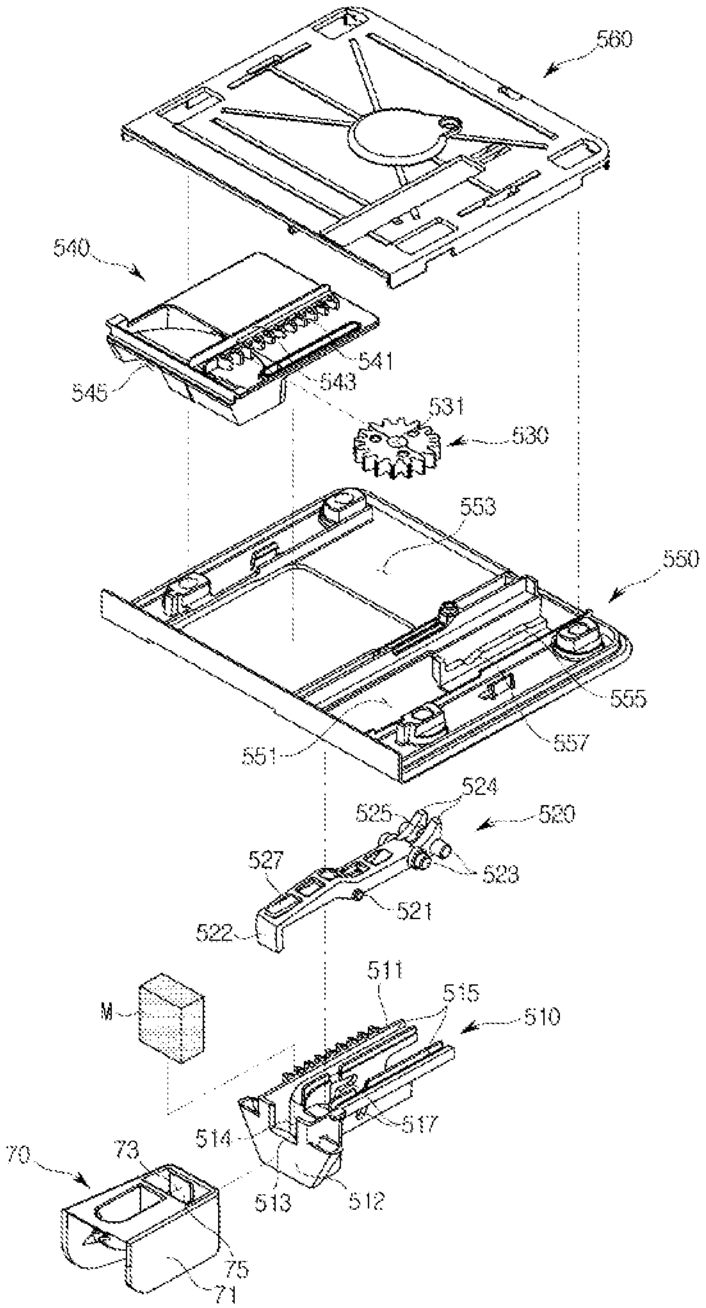

[Fig. 29]
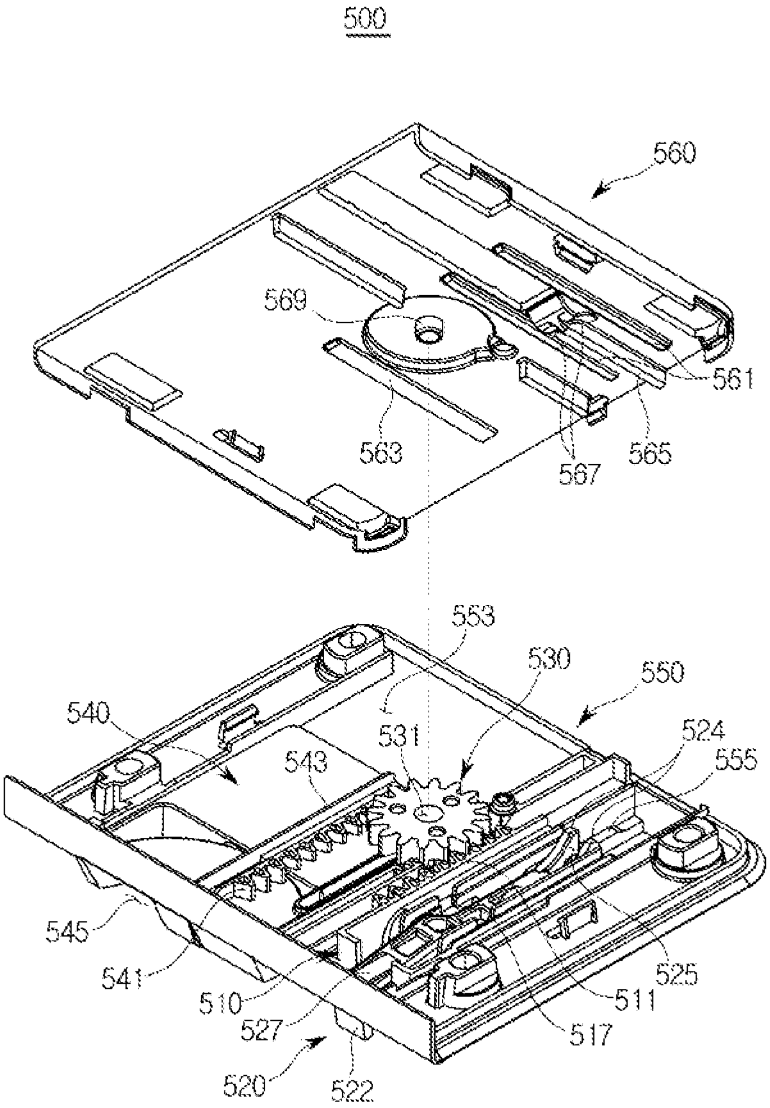

[Fig. 30]
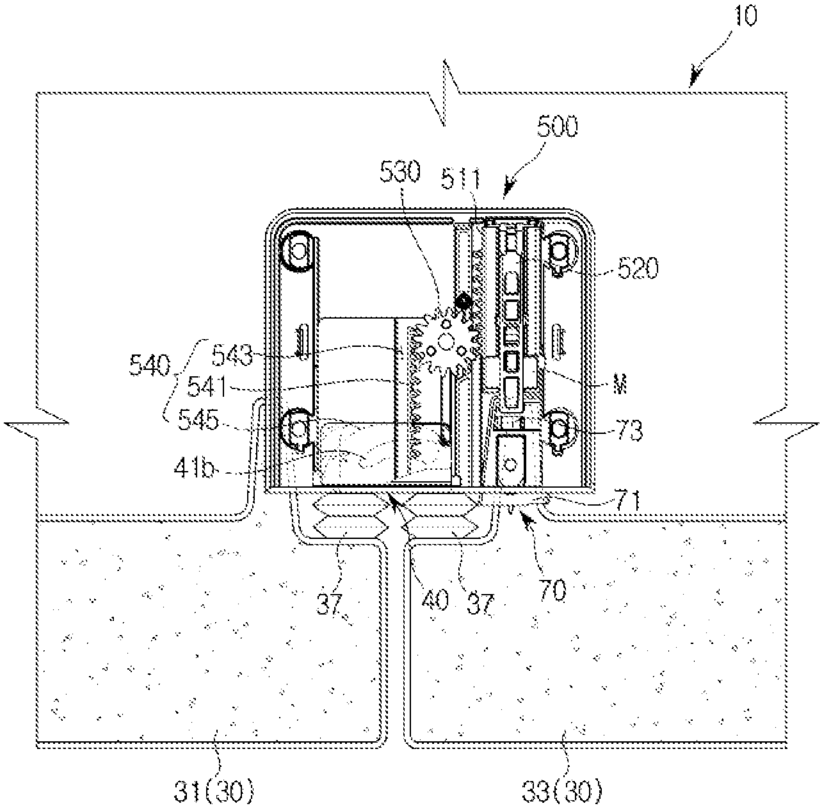
[Fig. 31]
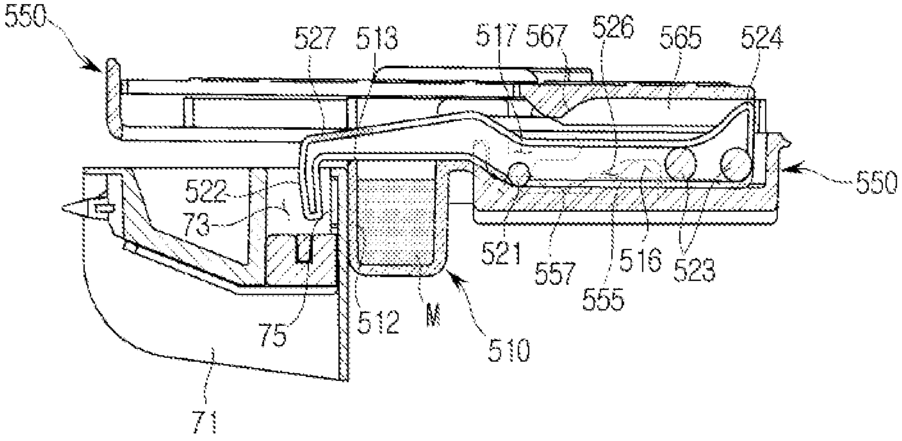

[Fig. 32]
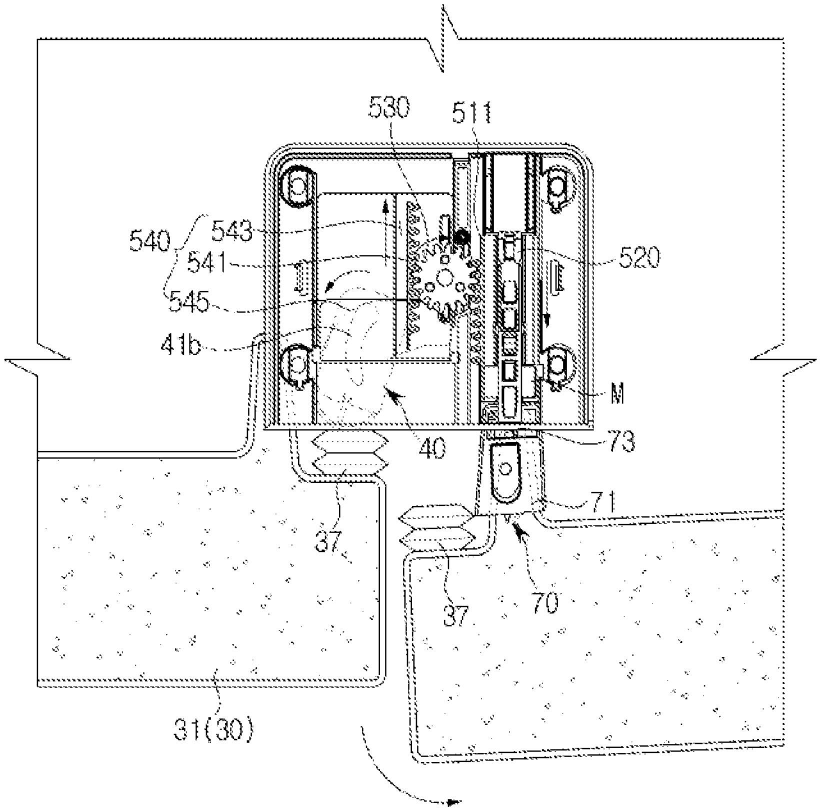
[Fig. 33]
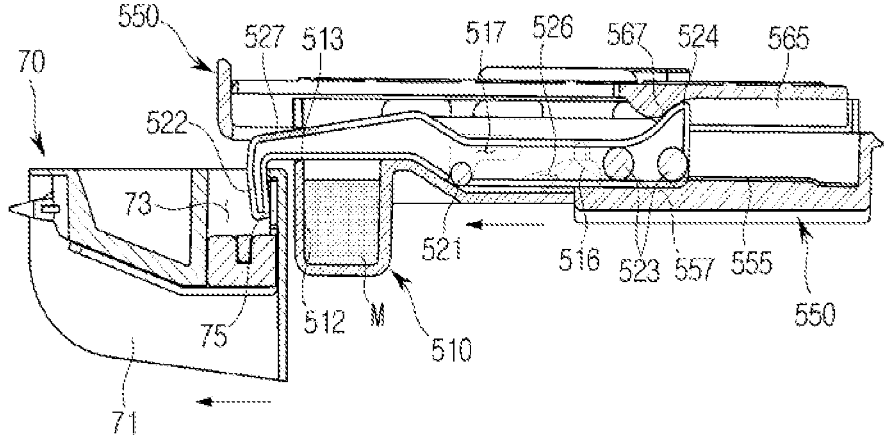

[Fig. 34]
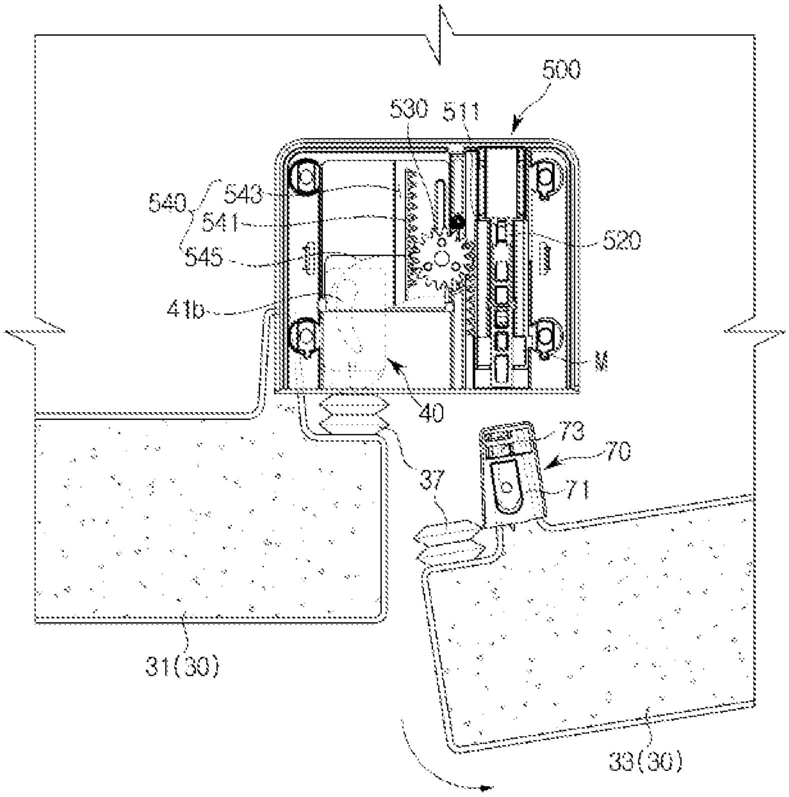
[Fig. 35]
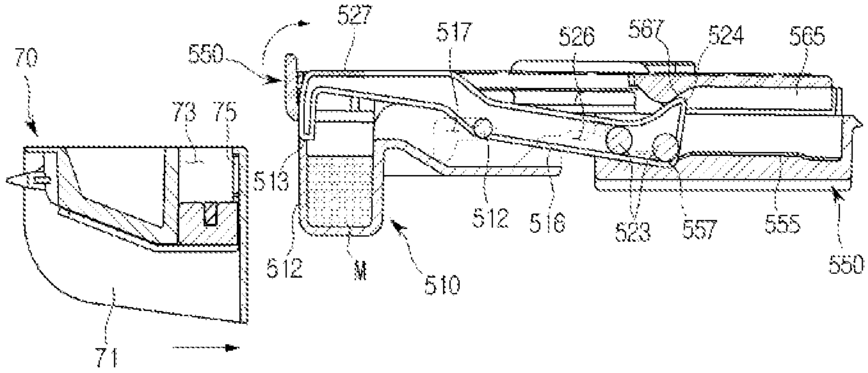

[Fig. 36]
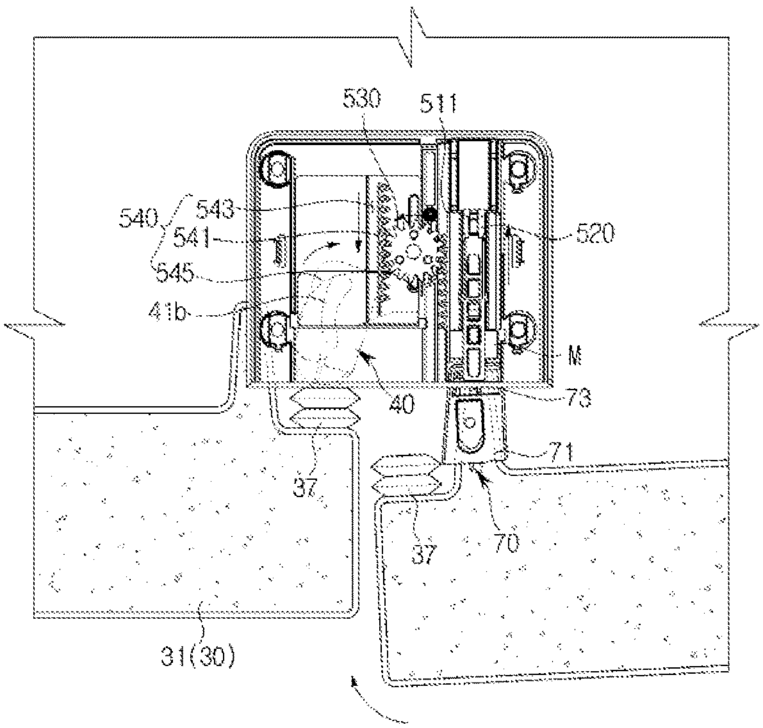
[Fig. 37]
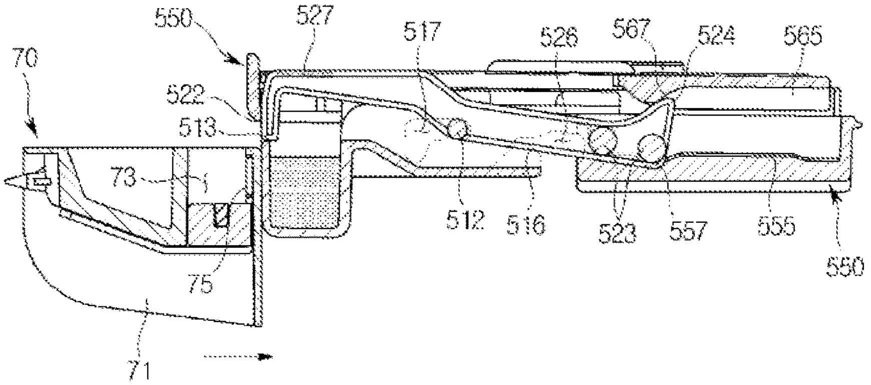
[Fig. 38]
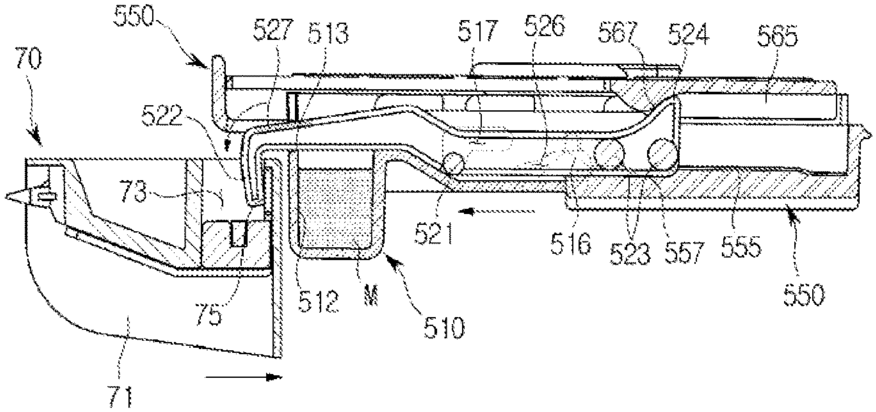

REFRIGERATOR

CROSS-REFERENCE TO RELATED APPLICATIONS

This application is a continuation application of U.S. patent application Ser. No. 17/544,421 filed on Dec. 7, 2021, which is a continuation application of U.S. patent application Ser. No. 16/895,586 filed on Jun. 8, 2020, which is a continuation application of U.S. patent application Ser. No. 16/402,609 filed on May 3, 2019, which is a continuation application of U.S. patent application Ser. No. 15/957,108 filed on Apr. 19, 2018, which is a continuation application of U.S. patent application Ser. No. 15/423,004 filed on Feb. 2, 2017, which is a continuation application of U.S. patent application Ser. No. 15/204,143 filed on Jul. 7, 2016, which is a continuation application of PCT International Patent Application No. PCT/KR2015/000064, filed Jan. 5, 2015, which claims the foreign priority benefit under 35 U.S.C. § 119 of Korean Patent Application No. 10-2014-0002011, filed Jan. 7, 2014, and Korean Patent Application No. 10-2014-0112110, filed Aug. 27, 2014, the contents of which are incorporated herein by reference.

TECHNICAL FIELD

Disclosed herein is a refrigerator with a rotating bar which seals a gap between a pair of doors.

BACKGROUND ART

Generally, a refrigerator is a home appliance which includes a storage compartment for storing food and a cool air supply device to keep food fresh.

Refrigerators may be classified according to shapes of a storage compartment and a door and may be classified into top mounted freezer type refrigerators in which a storage compartment is partitioned into a top and a bottom by a horizontal partition to form a freezing compartment on the top and a refrigerating compartment on the bottom and bottom mounted freezer (BMF) type refrigerators in which a refrigerating compartment is formed on a top and a freezing compartment is formed on a bottom.

Also, there are side by side (SBS) type refrigerators in which a storage compartment is partitioned by a vertical partition into left and right sides and includes a freezing compartment formed on one side and a refrigerating compartment formed on the other side and French door refrigerators (FDR) in which a storage compartment is partitioned by a horizontal partition and includes a refrigerating compartment formed above and a freezing compartment formed below while the refrigerating compartment on top is opened and closed by a pair of doors.

Meanwhile, a gasket is provided at a door of a refrigerator to seal a gap between the door and a body when the door is closed.

However, in the case of the FDR type refrigerator, since the refrigerating compartment on top is opened and closed by the pair of doors but a vertical partition is not provided in the refrigerating compartment, it is impossible to seal a gap between the pair of doors using a gasket. Accordingly, in order to seal the gap between the pair of doors, a rotating bar rotatably installed at any one of the pair of doors is provided.

The rotating bar described above rotates in parallel to the pair of doors and seals the gap between the pair of doors when the pair of doors are closed. When the door at which the rotating bar is installed is opened, the rotating bar rotates perpendicular to the door in order not to interfere with the other door at which the rotating bar is not installed.

However, when the door at which the rotating bar is installed is closed and only the other door at which the rotating bar is not installed is opened, the rotating bar rotates and remains parallel to the pair of doors. Accordingly, when sizes of containers disposed on each of the left and right of the refrigerating compartment are the same, it is impossible to withdraw containers disposed in the refrigerating compartment on a side of the other door at which the rotating bar is not installed. Therefore, there is no choice but to form sizes of containers disposed on the left and right of the refrigerating compartment to be different.

DISCLOSURE

Technical Problem

One aspect of the present invention is to provide a refrigerator which allows a rotating bar to rotate to seal a gap between a pair of doors even when a door of the pair of doors at which the rotating bar is not installed is opened or closed.

Technical Solution

One aspect of the present invention provides a refrigerator including a body, a storage compartment provided with an open front side in the body, a door including a first door and a second door rotatably coupled with the body to open and close the open front side of the storage compartment, a rotating bar rotatably coupled with the first door, and a guide device provided at the body to induce the rotating bar to rotate. Here, the guide device includes a moveable member that is moved linearly according to opening and closing of the second door, a rotating unit which rotates in connection with the moveable member, and a guide unit that moved linearly in connection with the rotating unit in a direction opposite to that of the moveable member to guide the rotating bar to rotate.

The guide device may further include a base which accommodates the moveable member, the rotating unit, and the guide unit and a cover coupled with a top of the base.

A protruding portion with a first magnet built therein may be provided on an upper rear side of one side of the second door, and the moveable member may be provided as a rack with a second magnet built therein that is moved forward and backward by the protruding portion.

The rotating unit may be provided as a pinion gear and the rack may be engaged with the pinion gear and may include a first rack gear that is moved forward and backward linearly in the base and a contact portion provided at a front end of a bottom of the first rack gear to come in contact with the protruding portion and including the second magnet built therein.

The pinion gear may be rotatably coupled with the base by a rotate, and the rack and the guide unit may be disposed on both sides of the pinion gear to be moved linearly in opposite directions when the pinion gear rotates.

A guide protrusion may be provided on a top of the rotating bar, and the guide unit may include a guide groove which guides the guide protrusion and a second rack gear engaged with the pinion gear and moved linearly in a direction opposite to that of the first rack gear when the pinion gear rotates.

The rotating bar may be at a parallel position while the first door and the second door are closed, and when the first door is opened, the guide protrusion may be guided by the guide groove and the rotating bar may rotate to a perpendicular position.

The rotating bar may be at a parallel position while the first door and the second door are closed, and when the second door is opened, the rack may be moved forward due to magnetic forces of the first magnet built in the protruding portion and the second magnet built in the contact portion.

When the rack is moved forward, the pinion gear engaged with the first rack gear of the rack may rotate around the rotating shaft clockwise and the second rack gear of the guide unit engaged with the pinion gear may be moved backward.

When the guide unit is moved backward, the guide protrusion may be guided by the guide groove to allow the rotating bar to rotate counterclockwise and the rotating bar may rotate counterclockwise to the perpendicular position.

When the second door is closed, the protruding portion may come in contact with the contact portion to allow the rack to be moved backward, and when the rack is moved backward, the pinion gear engaged with the first rack gear may rotate around the rotating shaft counterclockwise and the second rack gear of the guide unit engaged with the pinion gear may be moved forward.

When the guide unit is moved forward, the guide protrusion may be guided by the guide groove to allow the rotating bar to rotate clockwise and the rotating bar may rotate clockwise to the parallel position.

A latch unit may be provided on a rear side of a top of one side of the second door, and the moveable member may be provided as a rack which is moved forward and backward by the latch unit and includes a held portion held by the latch unit and released therefrom.

The latch may include a case coupled with the second door, a latch partially accommodated in the case and coupled with the case to be rotatable left and right, an elastic unit which allows the latch to return to an original position after rotating, and a cover which covers a top of the case.

A hinge protrusion with which the latch is rotatably coupled and a fixing protrusion to which one side of the elastic unit is fixed may be provided at the case.

The latch may include a hinge hole rotatably coupled with the hinge protrusion, a holding groove which holds or releases the rack depending on the opening and closing of the second door, a head portion which comes in contact with the rack and, before the rack is held by the holding groove, guides the rack to be held by the holding groove, and an elastic unit coupling portion with which another side of the elastic unit whose one side is fixed to the fixing protrusion is coupled.

A holding unit may be provided at a rear side of a top of one side of the second door, and the moveable member may be provided as a rack moved forward and backward by the holding unit.

The guide device may further include a latch unit coupled with the rack to be rotatable upward and downward to be held by or released from the holding unit and held by the holding unit when the second door is opened.

The holding unit may include a case coupled with the second door, a holding groove provided at a top of the case to hold and release the latch unit, and a first reinforcing member formed of a steel material to reinforce the case.

The rotating unit may be provided as a pinion gear, and the rack may include a first rack gear engaged with the pinion gear and moved forward and backward linearly in the base, a contact portion provided at a front end portion of a bottom of the first rack gear and in contact with the holding unit, a supporting portion provided above the contact portion to support a front end portion of the latch unit, a magnet accommodating groove provided in the rear of the contact portion to accommodate a magnet, and a supporting rib which supports the latch unit to prevent the latch unit from being moved backward after having moved forward.

A pair of coupling protrusions may be provided at the latch unit to allow the latch unit to be rotatably coupled with the rack, and a pair of coupling holes which guide the pair of coupling protrusions to allow the latch unit to rotate upward and downward may be provided at the first rack gear.

The latch unit may include a held portion provided at the front end portion to be held by and released from the holding groove of the holding unit, a roller provided at a rear end portion to allow the latch unit to be moved forward and backward linearly, a pair of rotating protrusions provided above the roller to allow the latch unit to rotate upward and downward, a latch unit guide groove provided between the pair of rotating protrusions to guide the latch unit to be moved forward and backward linearly, a supporting groove supported by the supporting rib to prevent the latch unit from being moved backward after having moved forward, and a second reinforcing member formed of a steel material to reinforce the front end portion of the latch unit.

One aspect of the present invention also provides a refrigerator including a body, a storage compartment provided with an open front side in the body, a door which includes a first door and a second door rotatably coupled with the body to open and close the open front side of the storage compartment, a rotating bar rotatably coupled with the first door, and a guide device provided at the body to induce the rotating bar to rotate. Here, the rotating bar is at a parallel position when the first door and the second door are closed, and when the second door is opened, the guide device induces the rotating bar to rotate to allow the rotating bar to rotate to a perpendicular position.

One aspect of the present invention also provides a refrigerator including a body, a storage compartment provided with an open front side in the body, a door which includes a first door and a second door rotatably coupled with the body to open and close the open front side of the storage compartment, a rotating bar rotatably coupled with the first door and including a guide protrusion that is movable upward and downward due to an elastic force of a spring, and a guide device provided at the body to induce the rotating bar to rotate. Here, the rotating bar is at a parallel position when the first door and the second door are closed, and when the second door is opened, the guide device induces the rotating bar to rotate to allow the rotating bar to rotate to a perpendicular position. Also, when the first door is closed in a state in which the rotating bar rotates to the parallel position while the first door and the second door are opened, the rotating bar remains in the parallel position, and when the second door is closed, the guide protrusion is moved downward and then moved upward by the guide device and the rotating bar remains in the parallel position.

Advantageous Effects

According to embodiments of the present invention, sizes of containers disposed on the left and right of a refrigerating compartment may be identical and may share components of an inner casing.

BRIEF DESCRIPTION OF DRAWINGS

FIG. 1 is a front view of a refrigerator in accordance with one embodiment of the present invention.

FIG. 2 is an exploded perspective view of a rotating bar in accordance with one embodiment of the present invention.

FIG. 3 is an exploded perspective view of a guide device in accordance with one embodiment of the present invention.

FIG. 4 is a view illustrating a state in which a cover is separated from the guide device in accordance with one embodiment of the present invention.

FIG. 5 is a view illustrating a state in which a gap between a first door and a second door is sealed by the rotating bar when the first door and the second door are closed by the guide device in accordance with one embodiment of the present invention.

FIG. 6 is a view illustrating a state in which the first door is opened in FIG. 5.

FIGS. 7 and 8 are views illustrating an operation of opening the second door in FIG. 5.

FIG. 9 is a view illustrating an operation of closing the first door when the rotating bar in accordance with one embodiment of the present invention has rotated to a parallel position to seal the gap between the first door and the second door while both the first door and the second door are open.

FIG. 10 is a view illustrating a state in which the second door is closed after the first door is closed in FIG. 9.

FIG. 11 is an exploded perspective view of a guide device in accordance with another embodiment of the present invention.

FIG. 12 is a view illustrating a state in which a gap between a first door and a second door is sealed by a rotating bar when the first door and the second door are closed by the guide device shown in FIG. 11.

FIGS. 13 to 16 are views illustrating an operation of opening the second door in FIG.

FIG. 17 is an exploded perspective view of a guide device in accordance with still another embodiment of the present invention.

FIG. 18 is a view illustrating a state in which a gap between a first door and a second door is sealed by a rotating bar when the first door and the second door are closed by the guide device shown in FIG. 17.

FIGS. 19 and 20 are views illustrating an operation of opening the second door in FIG. 18.

FIG. 21 is an exploded perspective view of a guide device in accordance with still another embodiment of the present invention.

FIG. 22 is a view illustrating a state in which a cover is separated from the guide device shown in FIG. 21.

FIG. 23 is a view illustrating a state in which a gap between a first door and a second door is sealed by a rotating bar when the first door and the second door are closed by the guide device shown in FIG. 21.

FIGS. 24 and 25 are views illustrating an operation of opening the first door in FIG. 23.

FIGS. 26 and 27 are views illustrating an operation of opening the second door in FIG. 23.

FIG. 28 is an exploded perspective view of a guide device in accordance with yet another embodiment of the present invention.

FIG. 29 is a view illustrating a state in which a cover is separated from the guide device shown in FIG. 28.

FIG. 30 is a view illustrating a state in which a gap between a first door and a second door is sealed by a rotating bar when the first door and the second door are closed by the guide device shown in FIG. 28.

FIG. 31 is a view illustrating a state in which a held portion of a latch unit is held by a holding groove of a holding unit in the guide device shown in FIG. 30.

FIG. 32 is a view illustrating an operation of opening the second door in FIG. 30.

FIG. 33 is a view illustrating a state in which the latch unit and a rack are moved forward by the holding unit in the guide device shown in FIG. 32.

FIG. 34 is a view illustrating a state in which the second door is completely opened in FIG. 32.

FIG. 35 is a view illustrating a state in which the latch unit rotates upward and the held portion is released from the holding groove in the guide device shown in FIG. 34.

FIG. 36 is a view illustrating a state in which the second door is closed in FIG. 34.

FIGS. 37 and 38 are views illustrating operations of the holding unit, the rack, and the latch unit during a process in which the second door shown in FIG. 36 is closed.

MODE FOR INVENTION

Hereinafter, embodiments of the present invention will be described in detail with reference to the attached drawings.

As shown in FIG. 1, a refrigerator includes a body 10 which forms an exterior, a storage compartment 20 formed in the body 10 while being partitioned into a top and a bottom, a door 30 which opens and closes the storage compartment 20, and a cool air supplying device (not shown).

The body 10 includes an inner casing (not shown) which forms the storage compartment 20, an outer casing (not shown) coupled with an outside of the inner casing to form the exterior, and an insulator (not shown) foamed between the inner casing and the outer casing to prevent leakage of cool air from the storage compartment 20.

The cool air supplying device may include a compressor (not shown) which compresses a refrigerant, a condenser (not shown) which condenses the refrigerant, an expansion valve (not shown) which expands the refrigerant, and an evaporator (not shown) which evaporates the refrigerant.

The storage compartment 20 may be provided with an open front side, in which a refrigerating compartment 21 is provided above and a freezing compartment 23 is provided below a partition wall 11 which partitions the storage compartment 20 into a top and a bottom. A container 25 may be provided on each of the left and right of the refrigerating compartment 21.

The storage compartment 20 may be opened and closed by the door 30, the refrigerating compartment 21 of the storage compartment 20 may be opened and closed by a pair of doors 31 and 33 rotatably coupled with the body 10, and the freezing compartment 23 may be opened and closed by a sliding door 35 slidably mounted on the body 10.

The pair of doors 31 and 33 which open and close the refrigerating compartment 21 may be disposed on the right and left, respectively. The door disposed on the left is referred to as a first door 31, and the door disposed on the left is referred to as a second door 33.

The first door 31 may open and close a left part of the open front side of the refrigerating compartment 21, and the second door 33 may open and close a right part of the open front side of the refrigerating compartment 21.

Door guards 31*a* and 33*a* capable of containing foods may be provided in the rears of the first door 31 and the second door 33. Gaskets 37 which seal gaps from the body 10 while the first door 31 and the second door 33 are closed may be provided on edges of rear sides of the first door 31 and the second door 33.

The gap between each of the first door 31 and the second door 33 and the body 10 may be sealed by the gasket 37, thereby preventing leakage of cool air. However, a gap between the first door 31 and the second door 33 may be formed which may allow the cool air to leak.

To prevent this, a rotating bar 40 is rotatably coupled with the first door 31 and rotates according to opening and closing of the first door 31, and may seal the gap between the first door 31 and the second door 33.

The rotating bar 40 is provided to have a bar shape formed to extend along the height of the first door 31, and a guide device 100 which induces the rotating bar 40 to rotate is provided at the body 10.

An operation in which the rotating bar 40 is connected to the guide device 100 and rotates according to the opening and closing of the first door 31 to seal the gap between the first door 31 and the second door 33 is as follows.

As shown in FIGS. 1 and 2, the rotating bar 40 includes a case 41 which forms an exterior and has an accommodating space 41*a* therein and one open side, an insulating member 43 accommodated in the accommodating space 41*a* of the case 41, a rotating bar cover 45 coupled with the one open side of the case 41, a metal plate 47 coupled with an outside of the rotating bar cover 45, and a heating member 49 disposed in a space between the rotating bar cover 45 and the metal plate 47.

A guide protrusion 41*b* connected to the guide device 100 which will be described below as guiding the rotating bar 40 to rotate is provided at a top of the case 41.

To allow the guide protrusion 41*b* to protrude outward from the case 41, a through portion 44 may be provided at the top of the case 41. The through portion 44 may be formed as a hole in the same shape as the guide protrusion 41*b*.

An incline 41*d* is provided on one side of the guide protrusion 41*b*, and a spring S having an elastic force is provided below the guide protrusion 41*b*.

A top of the spring S is coupled with the guide protrusion 41*b* and a bottom of the spring S is coupled with a coupling protrusion 44 to allow the guide protrusion 41*b* to be movable upward and downward through the through portion 42 due to the elastic force of the spring S.

The rotating bar 40 is rotatably coupled with the first door 31 by a hinge bracket (not shown), and a plurality of coupling portions 41*c* rotatably coupled with the hinge bracket are provided at the case 41.

The insulating member 43 is for insulating the refrigerating compartment 21 and may be formed of a material containing expanded polystyrene (EPS) which has excellent heat insulation performance and is light.

The insulating member 43 may be formed to have a shape capable of being inserted into the accommodating space 41*a* of the case 41 and thus may be inserted into the accommodating space 41*a* of the case 41.

The rotating bar cover 45 which covers the one open side of the case 41 may be coupled with the one open side of the case 41 after the insulating member 43 is inserted into the accommodating space 41*a* of the case 41.

The rotating bar cover 45 may be formed of a plastic material with low heat conductivity, and for example, may be integrally injection-molded.

Although not shown in the drawing, heat-insulating structures may be provided on both sides of the rotating bar cover 45 to prevent heat generated by the heating member 49 from penetrating the storage compartment 20.

The metal plate 47 formed of a metal material may be coupled with the outside of the cover 45 to be in contact with the gaskets 37 due to magnets included in the gaskets 37 and to provide rigidity to the rotating bar 40.

The heating member 49 which emits heat may be disposed in the space between the rotating bar cover 45 and the metal plate 47 to prevent dew formation on the metal plate 47 caused by a difference in temperatures inside and outside the refrigerating compartment 21.

To prevent heat generated by the heating member 49 from being excessively transferred to the metal plate 47, a heating cable formed of a metal plate heating wire covered with an insulating material such as silicone, FEP, etc. may be used as the heating member 49.

Accordingly, the heating member 49 may be disposed in linear contact with the metal plate 47 rather than in surface contact therewith, so that only minimal heat is transferred to the metal plate 47 and dew formation on the metal plate 47 is prevented.

Due to the configuration described above, when the first door 31 and the second door 33 are closed, the rotating bar 40 may minimize penetration of the heat generated by the heating member 49 of the rotating bar 40 into the refrigerating compartment 21 while in contact with the gaskets of the first door 31 and the second door 33 and sealing the gap between the first door 31 and the second door 33.

Accordingly, since not only does the heat insulating performance of the rotating bar 40 improve but thermal loss of the heating member 49 is also minimized, energy for preventing the dew formation on the rotating bar 40 may be reduced.

Since the rotating bar 40 is rotatably provided at the first door 31, the rotating bar 40 is connected to the guide device 100 and rotates according to rotating of the first door 31 when the second door 33 is closed. When the first door 31 and the second door 33 are closed, the rotating bar 40 seals the gap between the first door 31 and the second door 33. When the first door 31 is opened, the rotating bar 40 releases the sealing of the gap between the first door 31 and the second door 33. However, when the first door 31 and the second door 33 are closed and then only the second door 33, i.e., without the first door 31, is opened, the rotating bar 40 remains in a state in which it seals the gap between the first door 31 and the second door 33. Accordingly, when sizes of the containers 25 disposed on the left and right of the refrigerating compartment 21 are symmetrical, it is impossible to withdraw the container 25 disposed on the right. Therefore, there is no choice but to form the sizes of the containers 25 disposed on both the left and right of the refrigerating compartment 21 to be different.

Also, since the rotating bar 40 remains in the state in which it seals the gap between the first door 31 and the second door 33, when a user puts foods into the refrigerating compartment 21 or takes foods out of the refrigerating compartment 21, the rotating bar 40 may interfere and inconvenience the user.

Accordingly, the body 10 includes the guide device 100 capable of allowing the rotating bar 40 to rotate according to opening and closing of the second door 33 to allow the sizes of the containers 25 disposed on both the left and right of the refrigerating compartment 21 to be symmetrical, to allow the container 25 disposed on the right of the refrigerating compartment 21 to be withdrawn even when only the second door 33 disposed on the right of the refrigerating compartment 21 is opened, and to eliminate the inconvenience of the user in use of the refrigerating compartment 21.

As shown in FIGS. 1, 3, and 4, the guide device 100 is provided in the middle of a top of the refrigerating compartment 21.

A protruding portion 39 is provided at a top of one side of the rear of the second door 33 and a first magnet 39*a* is built in the protruding portion 39 to allow the rotating bar 40 of the guide device 100 to rotate according to the opening and closing of the second door 33.

Depending on the opening and closing of the second door 33, the protruding portion 39 comes in contact with the guide device 100 and is released therefrom to operate the guide device 100 to allow the rotating bar 40 to rotate.

The guide device 100 includes a rack 110 that is moved forward and backward linearly depending on the opening and closing of the second door 33, a pinion gear 120 engaged with the rack 110 and rotating when the rack 110 is moved linearly, a guide unit 130 which is engaged with the pinion gear 120 and moves forward and backward linearly to allow the rotating bar 40 to rotate, a base 140 which accommodates the rack 110, the pinion gear 120, and the guide unit 130, and a cover 150 coupled with a top of the base 140.

The rack 110 includes a first rack gear 111 engaged with the pinion gear 120 and that is moved forward and backward linearly in the base 140, a first guide rail 113 provided at a top of the first rack gear 111 to guide the rack 110 to be movable forward and backward, and a contact portion 115 provided at a front end portion of a bottom of the first rack gear 111 to come in contact with the protruding portion 39 when the second door 33 is closed.

The first rack gear 111 is engaged with the pinion gear 120 to allow the pinion gear 120 to rotate when the rack 110 is moved forward and backward linearly.

The first guide rail 113 is provided at the top of the first rack gear 111 and a first guide portion 151 having a shape corresponding to the first guide rail 113 is provided at the cover 150 in such a way that the first guide rail 113 moves along the first guide portion 151 to allow the rack 110 to be movable forward and backward.

The contact portion 115 is provided at the front end portion of the bottom of the first rack gear 111, and a second magnet 117 is built therein.

The contact portion 115 is in contact with the protruding portion 39 and moved backward by the protruding portion 39 when the second door 33 is to be closed. When the second door 33 is opened from a closed state, the contact portion 115 is moved forward with the second door 33 due to a magnetic force between the first magnet 39*a* built in the protruding portion 39 and the second magnet 117 built in the contact portion 115 to allow the rack 110 to move forward.

The pinion gear 120 is provided to be engaged with the first rack gear 111 of the rack 110 and includes a rotating shaft 121.

The rotating shaft 121 is rotatably coupled with a rotating hole 143 of the base 140 to allow the pinion gear 120 to be rotatably coupled with the base 140.

Because it is provided to be engaged with the rack 110, the pinion gear 120 rotates around the rotating shaft 121 when the rack 110 is moved forward and backward. The pinion gear 120 rotates around the rotating shaft 121 counterclockwise when the rack 110 is moved backward and rotates around the rotating shaft 121 clockwise when the rack 110 is moved forward.

The guide unit 130 includes a second rack gear 131 that is engaged with the pinion gear 120 and moved forward and backward linearly in the base 140, a second guide rail 133 and a third guide rail 135 provided at a top of the second rack gear 131 to allow the guide unit 130 to be linearly movable forward and backward, and a guide groove 137 which guides the guide protrusion 41*b* provided at the rotating bar 40 to induce the rotating bar 40 to rotate.

The second rack gear 131 is engaged with the pinion gear 120 and moved forward and backward linearly by the pinion gear 120 rotating when the rack 110 is moved forward and backward linearly in such a way that the guide unit 130 is moved linearly by the second guide rail 133 and the third guide rail 135. Here, the second rack gear 131 is moved linearly in a direction opposite to that of the rack 110.

The second guide rail 133 and the third guide rail 135 are provided at the top of the second rack gear 131 and a second guide portion 153 and a third guide portion 155 having shapes corresponding to the second guide rail 133 and the third guide rail 135 are provided at the cover 150 in such a way that the second guide rail 133 and the third guide rail 135 move along the second guide portion 153 and the third guide portion 155, thereby allowing the guide unit 130 to be moved forward and backward.

The guide groove 137 is provided below the second rack gear 131 and guides the guide protrusion 41*b* of the rotating bar 40 to induce the rotating bar 40 to rotate.

When the guide unit 130 is moved forward and backward linearly, the rotating bar 40 rotates due to the guide protrusion 41*b* guided by the guide groove 137 moved forward and backward. The rotating of the rotating bar 40 according to the movement of the guide unit 130 will be described below.

The base 140 includes a guide hole 141 which guides the contact portion 115 to allow the rack 110 to move forward and backward linearly, the rotating hole 143 with which the rotating shaft 121 of the pinion gear 120 is rotatably coupled, and an accommodating portion 145 which accommodates the guide unit 130.

The guide hole 141 is provided to extend forward and backward to allow the contact portion 115 of the rack 110 to pass through and come in contact with the protruding portion 39 of the second door 33 and guides the rack 110 to be movable forward and backward depending on the opening and closing of the second door 33.

The accommodating portion 145 accommodates the guide unit 130 and provides a space in which the guide unit 130 is movable forward and backward.

The cover 150 is coupled with the top of the base 140. The first guide portion 151, the second guide portion 153, and the third guide portion 155 having shapes corresponding to the first guide rail 113 of the rack 110 and the second guide rail 133 and the third guide rail 135 of the guide unit 130 are provided at a bottom of the cover 150.

Next, referring to FIGS. 5 to 8, an operation of the rotating bar 40 being guided by the guide device 100 to rotate according to the opening and closing of the first door 31 and the second door 33 will be described.

As shown in FIG. 5, when both the first door 31 and the second door 33 are closed, the rotating bar 40 rotates to a position approximately parallel to a longitudinal direction of the first door 31 to seal the gap between the first door 31 and the second door 33. Hereinafter, this position will be referred to as a parallel position.

When both the first door 31 and the second door 33 are closed and then the first door 31 is opened, the rotating bar 40 is moved with the first door 31 and the guide protrusion 41*b* is guided by the guide groove 137 in such a way that the rotating bar 40 rotates counterclockwise to a position approximately perpendicular to the longitudinal direction of the first door 31, thereby unsealing the gap between the first door 31 and the second door 33. Hereinafter, this position will be referred to as a perpendicular position.

Here, since the second door 33 is closed, the rack 110 is prevented by the protruding portion 39 from being moved and the guide device 100 is not operated.

When the open first door 31 is closed, in contrast to the opening of the first door 31, the rotating bar 40 rotates clockwise and is at the parallel position to seal the gap between the first door 31 and the second door 33.

When the second door 33 is opened as shown in FIGS. 7 and 8 while both the first door 31 and the second door 33 are closed as shown in FIG. 5, the rack 110 is moved forward due to the magnetic force between the first magnet 39*a* built in the protruding portion 39 and the second magnet 117 built in the contact portion 115 of the rack 110.

When the rack 110 is moved forward, the pinion gear 120 engaged with the first rack gear 111 of the rack 110 rotates around the rotating shaft 121 clockwise and the second rack gear 131 of the guide unit 130 engaged with the pinion gear 120 is moved backward.

When the guide unit 130 is moved backward, the guide protrusion 41*b* is guided by the guide groove 137 that is moved backward and then the rotating bar 40 rotates counterclockwise.

Accordingly, when the second door 33 is opened while the first door 31 is closed, the rotating bar 40 rotates to the perpendicular position and unseals the gap between the first door 31 and the second door 33.

When the second door 33 is closed again, since the protruding portion 39 pushes the contact portion 115, the rack 110, the pinion gear 120, and the guide unit 130 operate in a direction opposite to a direction when the second door 33 is opened.

In detail, when the second door 33 is closed from a state shown in FIG. 8 in which the second door 33 is open, since the protruding portion 39 pushes the contact portion 115 as shown in FIG. 7, the rack 110 is moved backward and the pinion gear 120 engaged with the first rack gear 111 of the rack 110 rotates around the rotating shaft 121 counterclockwise.

When the pinion gear 120 rotates around the rotating shaft 121 counterclockwise, since the second rack gear 131 engaged with the pinion gear 120 is moved forward, the guide unit 130 is moved forward.

When the guide unit 130 is moved forward, the guide protrusion 41*b* is guided by the guide groove 137 that is moved forward and then the rotating bar 40 rotates clockwise.

Accordingly, when the second door 33 is closed while the first door 31 is closed, the rotating bar 40 rotates to the parallel position and seals the gap between the first door 31 and the second door 33.

Since a process of closing the second door 33 is described with reference to the drawing which illustrates the process of opening the second door 33, the directions shown by arrows in the drawings are opposite to the directions in the opening of the second door 33.

It is necessary for the rotating bar 40 to rotate to the perpendicular position to unseal the gap between the first door 31 and the second door 33 when both the first door 31 and the second door 33 are open. However, as shown in FIG. 9, the rotating bar 40 may be in the parallel position while both the first door 31 and the second door 33 are open.

When the first door 31 is closed from the state in which both the first door 31 and the second door 33 are open and the rotating bar 40 has rotated to the parallel position, the rotating bar 40 is not affected by the guide groove 137. Accordingly, as shown in FIG. 10, the rotating bar 40 remains in the parallel position.

Here, when the second door 33 is closed, the protruding portion pushes the contact portion 115. Accordingly, the rack 110 is moved backward, and the pinion gear 120 engaged with the first rack gear 111 of the rack 110 rotates around the rotating shaft 121 counterclockwise.

When the pinion gear 120 rotates around the rotating shaft 121 counterclockwise, since the second rack gear 131 engaged with the pinion gear 120 is moved forward, the guide unit 130 is moved forward.

The guide unit 130 is moved forward to come in contact with the incline 41*d* (refer to FIG. 2) of the guide protrusion 41*b*. The guide protrusion 41*b* provided to be movable upward and downward by the spring S is moved downward through the through portion (refer to FIG. 2).

When the second door 33 is completely closed, since the guide protrusion 41*b* moved downward is located in the guide groove 137 of the guide unit 130, the guide protrusion 41*b* is moved upward due to the elastic force of the spring S to a state shown in FIG. 5.

Accordingly, when the user leaves both the first door 31 and the second door 33 open by mistake and the rotating bar 40 has rotated to the parallel position, even though the first door 31 is closed while the rotating bar 40 rotates to the parallel position, the rotating bar 40 is at a normal position when the second door 33 is closed.

Next, guide devices according to other embodiments will be described.

As shown in FIG. 11, a guide device 200 may include a rack 210 that is moved forward and backward linearly depending on the opening and closing of the second door 33, a pinion gear 220 engaged with the rack 210 and rotating when the rack 210 is moved linearly, a guide unit 230 which is engaged with the pinion gear 220 and moves forward and backward linearly to allow the rotating bar 40 to rotate, a base 240 which accommodates the rack 210, the pinion gear 220, and the guide unit 230, and a cover 250 coupled with a top of the base 240.

Since configurations of a first rack gear 211 and a first guide rail 213 in a configuration of the rack 210 in which the first rack gear 211, the first guide rail 213, and a held portion 215 are provided are identical to configurations shown in FIGS. 3 and 4, repetitive description will be omitted.

Although similar to the contact portion 115 shown in FIGS. 3 and 4, the held portion 215 does not include a magnet built therein and has a cylindrical shape that can be easily held by a latch unit 50.

Since a configuration in which a rotating shaft 221 is provided at the pinion gear 220, a configuration in which the guide unit 230 includes a second rack gear 231, a second guide rail 233, a third guide rail 235, and a guide groove 237, a configuration in which the base 240 includes a guide hole 241, a rotating hole 243, and an accommodating portion 245, and a configuration in which the cover 250 includes a first guide portion 251, a second guide portion 253, and a third guide portion 255 are identical to configurations shown in FIGS. 3 and 4, repetitive description thereof will be omitted.

As other configurations, first, instead of a protruding portion, the latch unit 50 may be provided at the second door 33, which is a difference between the configuration of using the magnetic force between the first magnet 39*a* built in the protruding portion 39 and the second magnet 117 built in the contact portion 115 in the configuration shown in FIGS. 3 and 4 and a configuration in which the guide device 200 is operated by an operation of holding between the held portion 215 and the latch unit 50.

The latch unit 50 includes a case 51 coupled with the second door 33, a latch 53 partially accommodated in the case 51 and coupled with the case 51 to be rotatable left and right, an elastic unit 55 which causes the latch 53 to return to an original position after rotating, and a cover 57 which covers a top of the case 51.

A hinge protrusion 51*a* with which the latch 53 is rotatably hinge-coupled and a fixing protrusion 51*b* to which one side of the elastic unit 55 is fixed are provided at the case 51.

The latch 53 includes a hinge hole 53*a* rotatably coupled with a hinge protrusion 51*a*, a holding groove 53*b* which holds and releases the held portion 215 of the rack 210 depending on the opening and closing of the second door 33, a head portion 53*c* which is in contact with the held portion 215 of the rack 210 and, before the held portion 215 is held by the holding groove 53*b*, guides the held portion to be held by the holding groove 53*b*, and an elastic unit coupling portion 53*d* with which another side of the elastic unit 55 is coupled.

Next, referring to FIGS. 12 to 15, an operation of the rotating bar 40 being guided by the guide device 200 to rotate according to the opening and closing of the second door 33 will be described.

Since the operation of the rotating bar 40 rotating depending on the opening and closing of the first door 31 is identical to the operation shown in FIGS. 5 and 6, repetitive description thereof will be described.

As shown in FIG. 12, when both the first door 31 and the second door 33 are closed, the rotating bar 40 rotates to a parallel position to seal the gap between the first door 31 and the second door 33.

Since the operation of opening and closing the first door 31 is identical to that shown in FIG. 6, repetitive description thereof will be omitted.

As shown in FIG. 13, since the holding groove 53*b* is held by the held portion 215 when the second door 33 is opened, the latch unit 50 is moved forward with the second door 33 to move the rack 210 forward.

When the rack 210 is moved forward by the latch unit 50, the pinion gear 220 engaged with the first rack gear 211 of the rack 210 rotates around the rotating shaft 121 clockwise and the second rack gear 231 of the guide unit 230 engaged with the pinion gear 220 is moved backward.

When the second rack gear 231 and the guide unit 230 are moved backward together, the guide protrusion 41*b* is guided by the guide groove 237 and the rotating bar 40 rotates counterclockwise.

Here, as shown in FIG. 14, after the movement of the latch 53 is completed and the rotating bar 40 rotates, the latch 53 rotates on the hinge protrusion 51*a* clockwise to allow the holding groove 53*b* of the latch 53 to be released from the held portion 215 and then rotates on the hinge protrusion 51*a* counterclockwise and returns to an original position as shown in FIG. 15 due to an elastic force of the elastic unit 55.

When the second door 33 is completely opened, the rotating bar 40 rotates counterclockwise to the perpendicular position as shown in FIG. 16.

When the second door 33 is closed again, since the latch unit 50 pushes the held portion 215 backward, the rack 210, the pinion gear 220, and the guide unit 230 operate in a direction opposite to a direction when the second door 33 is opened.

In detail, when the second door 33 is closed from a state shown in FIG. 16 in which the second door 33 is open, as shown in FIG. 15, the head portion 53*c* comes in contact with the held portion 215 and guides the held portion 215 to be held by the holding groove 53*b*.

Here, when the latch 53 rotates on the hinge protrusion 51*a* clockwise and then the held portion 215 is inserted into the holding groove 53*b*, the latch 53 rotates on the hinge protrusion 51*a* counterclockwise due to the elastic force of the elastic unit 55 to allow the holding groove 53*b* to be held by the held portion 215 as shown in FIG. 14.

When the second door 33 is closed while the holding groove 53*b* is held by the held portion 215, as shown in FIG. 13, the latch unit 50 pushes the held portion 215 backward in such a way that the rack 210 is moved backward.

When the rack 210 is moved backward, the pinion gear 220 engaged with the first rack gear 211 rotates around the rotating shaft 121 counterclockwise and the second rack gear 231 engaged with the pinion gear 220 is moved forward in such a way that the guide unit 230 is moved forward.

When the guide unit 230 is moved forward, the guide protrusion 41*b* is guided by the guide groove 237 to allow the rotating bar 40 to rotate counterclockwise and the rotating bar rotates counterclockwise to the parallel position as shown in FIG. 12.

Since a process of closing the second door 33 is described with reference to the drawing which illustrates the process of opening the second door 33, the directions shown by arrows in the drawings are opposite to the directions in the opening of the second door 33.

As shown in FIG. 17, a guide device 300 includes a case 310 coupled with the body a lever 320 moved forward and backward linearly depending on the opening and closing of the second door 33, a link 330 rotatably coupled with the case 310, a guide unit 340 which moves forward and backward linearly depending on the opening and closing of the second door 33 to allow the rotating bar 40 to rotate, and an elastic unit 350 which elastically supports a front portion of the guide unit 340.

Since, the configurations of the protruding portion 39 and the rotating bar 40 are identical to those shown in FIGS. 1 to 9, repetitive description thereof will be omitted.

The case 310 includes a first guide rail 311 which guides linear movement of the guide unit 340, a second guide rail 313 which guides linear movement of the lever 320, a rotating shaft 315 which allows the link 330 to be rotatably coupled, and a first elastic unit supporting portion 317 which supports one side of the elastic unit 350.

The lever 320 includes a first lever portion 321 that comes in contact with the protruding portion 39 when the second door 33 is closed and a second lever portion 323 that comes in contact with the link 330 when the lever 320 is moved backward by the protruding portion 39.

The link 330 is provided to have a semicircular shape and includes a rotating hole 331 rotatably coupled with the rotating shaft 315, a first link portion 333 that comes in contact with the second lever portion 323, and a second link portion 335 that comes in contact with the guide unit 340 when the link 330 rotates around the rotating shaft 315.

The guide unit 340 includes a roller 341 which allows the guide unit 340 to be moved forward and backward along the first guide rail 311, a second elastic unit supporting portion 343 which supports another side of the elastic unit 350, and a guide groove 345 which guides a guide protrusion 41*b* to allow the rotating bar 40 to rotate when the guide unit 340 is moved forward and backward.

The elastic unit 350 elastically supports the front portion of the guide unit 340 accommodated in the case 310. One side of the elastic unit 350 is supported by the first elastic unit supporting portion 317 provided on a front wall in the first guide rail 311, and the other side thereof is supported by the second elastic unit supporting portion 343 of the guide unit 340 to be compressed when the guide unit 340 is moved forward.

Next, referring to FIGS. 18 to 20, an operation of the rotating bar 40 being guided by the guide device 300 to rotate according to the opening and closing of the second door 33 will be described.

As shown in FIG. 18, when both the first door 31 and the second door 33 are closed, the rotating bar 40 rotates to a parallel position to seal the gap between the first door 31 and the second door 33.

As shown in FIGS. 19 and 20, when the second door 33 is opened from the state in which both the first door 31 and the second door 33 are closed, the protruding portion 39 provided at the second door 33 is moved forward.

When the protruding portion 39 is moved forward, the guide unit 340 is moved backward due to an elastic force of the elastic unit 350.

When the guide unit 340 is moved backward, the guide protrusion 41*b* of the rotating bar 40 is guided by the guide groove 345 provided at the guide unit 340 in such a way that the rotating bar 40 rotates counterclockwise to the perpendicular position.

Here, the guide unit 340 pushes the second link portion 335 of the link 330 in such a way that the link 330 rotates around the rotating shaft 315 clockwise.

When the link 330 rotates around the rotating shaft 315 clockwise, the first link portion 333 of the link 330 pushes the second lever portion 323 of the lever 320 in such a way that the lever 320 is moved forward.

When the second door 33 is closed, since the protruding portion 39 pushes the lever 320 backward, the lever 320, the link 330, and the guide unit 340 operate in a direction opposite to a direction when the second door 33 is opened.

In detail, when the second door 33 is closed from a state shown in FIG. 18 in which the second door 33 is open, as shown in FIG. 19, the protruding portion 39 comes in contact with the first lever portion 321 and pushes the lever 320 backward.

When the lever 320 is moved backward, the second lever portion 323 pushes the first link portion 333 of the link 330 in such a way that the link 330 rotates around the rotating shaft 315 counterclockwise.

When the link 330 rotates around the rotating shaft 315 counterclockwise and the second link portion 335 pushes the guide unit 340, the guide unit 340 moves forward and allows the rotating bar 40 to rotate clockwise.

The rotating bar 40 which rotates clockwise, as shown in FIG. 18, rotates to the parallel position to seal the gap between the first door 31 and the second door 33.

Since a process of closing the second door 33 is described with reference to the drawing which illustrates the process of opening the second door 33, the directions shown by arrows in the drawings are opposite to the directions in the opening of the second door 33.

As shown in FIGS. 21 and 22, a guide device 400 includes a case 410 coupled with the body 10, a pair of rack gears 420 moved forward and backward linearly depending on the opening and closing of the second door 33, a link 430 rotatably coupled with the case 410, a guide unit 440 which guides rotating of a rotating bar 60, and a cover 450 which covers a top of the case 410.

Since the configuration of the protruding portion 39 provided at the second door 33 is identical to that shown in FIGS. 1 to 9, repetitive description thereof will be omitted. Since the configuration of the rotating bar 60 is different from the configuration of the rotating bar shown in FIGS. 1 to 9, it will be described along with the guide device 400.

The case 410 includes a first rotating hole 411 with which a rotating shaft 431 provided at the link 430 is rotatably coupled and a pair of guide holes 413 which guide the pair of rack gears 420 to be linearly movable forward and backward.

The pair of guide holes 413 will be described along with the pair of rack gears 420. The pair of rack gears 420 include a first rack gear 421 disposed on the right of the link 430 and moved forward and backward linearly and a second rack gear 423 disposed on the left of the link 430 and moved linearly in a direction opposite to that of the first rack gear 421.

A first guide rail 421*a* guided along a first guide portion 453 provided at the cover 450 and guiding the first rack gear 421 to be moved forward and backward linearly is provided at a top of the first rack gear 421, and a first contact portion 421*b* that comes in contact with the protruding portion 39 of the second door 33 is provided at a front end portion of a bottom of the first rack gear 421.

A second guide rail 423*a* guided along a second guide portion 455 provided at the cover 450 and guiding the second rack gear 423 to be moved forward and backward linearly is provided at a top of the second rack gear 423, and a second contact portion 423*b* that comes in contact with a rack 441 is provided at a front end portion of a bottom of the second rack gear 423.

The pair of guide holes 413 are provided at the case 410 and include a first guide hole 415 which guides the first contact portion 421*b* of the first rack gear 421 to pass therethrough and be movable forward and backward therein and a second guide hole 417 which guides the second contact portion 423*b* of the second rack gear 423 to pass therethrough and be movable forward and backward therein.

The rotating shaft 431 is provided at the link 430. A bottom of the rotating shaft 431 is rotatably coupled with the first rotating hole 411 of the case 410 and a top of the rotating shaft 431 is rotatably coupled with a second rotating hole 451 of the cover 450.

Both sides of the link 430 are engaged with the first rack gear 421 and the second rack gear 423 to allow the first rack gear 421 and the second rack gear 423 to be moved linearly in mutually opposite directions.

The guide unit 440 includes the rack 441 coupled with a top of one side of the first door 31 and moved forward and backward linearly depending on the opening and closing of the second door 33, a pinion gear 443 engaged with the rack 441 and rotating to allow the rotating bar 60 to rotate when the rack 441 moves linearly, a housing 445 which accommodates the rack 441 and the pinion gear 443, an elastic unit 447 that elastically supports the rack 441, and a cover 449 which covers an open top of the housing 445.

A third guide rail 441*a* provided to correspond to a third guide portion 445*a* provided at the housing 445 and guiding the rack 441 to be linearly movable forward and backward is provided at a bottom of the rack 441.

A first hinge shaft 443*a* is provided at the pinion gear 443. A bottom of the first hinge shaft 443*a* is rotatably coupled with a first hinge hole 445*b* of the housing 445 and a top of the first hinge shaft 443*a* is rotatably coupled with a second hinge hole 449*a*.

The housing 445 includes the third guide portion 445*a* provided to correspond to the third guide rail 441*a* provided at the rack 441, the first hinge hole 445*b* with which the first hinge shaft 443*a* of the pinion gear 443 is rotatably coupled, and an elastic unit fixing portion 445*c* to which the elastic unit 447 is fixed.

The cover 449 includes the second hinge hole 449*a* with which the first hinge shaft 443*a* of the pinion gear 443 is rotatably coupled and a third hinge hole 449*b* with which a second hinge shaft 63 of the rotating bar 60 is rotatably coupled.

Unlike the configuration of the rotating bar 40 shown in FIGS. 1 to 9, the rotating bar does not include a guide protrusion but includes a rotating portion 61 engaged with the pinion gear 443 and rotating with the rotating bar 60 and the second hinge shaft 63 rotatably coupled with the cover 449.

Next, referring to FIGS. 23 to 27, an operation of the rotating bar 60 being guided by the guide device 400 to rotate according to the opening and closing of the second door 33 will be described.

As shown in FIG. 23, when both the first door 31 and the second door 33 are closed, the rotating bar 60 rotates to a parallel position to seal the gap between the first door 31 and the second door 33.

When the first door 31 is opened as shown in FIGS. 24 and 25 from the state in which both the first door 31 and the second door 33 are closed, contact between the rack 441 and the second contact portion 423*b* provided at the second rack gear 423 is released and then the rack 441 is moved backward due to an elastic force of the elastic unit 447.

When the rack 441 is moved backward, the pinion gear 443 engaged with the rack 441 rotates around the first hinge shaft 443*a* clockwise and the rotating portion 61 of the rotating bar 60, engaged with the pinion gear 443, also rotates with the rotating bar 60 around the second hinge shaft 63 counterclockwise.

Accordingly, when the first door 31 is opened, the rotating bar 60 rotates to a perpendicular position.

When the first door 31 is closed, the rack 441, as shown in FIG. 24, the rack 441 comes in contact with the second rack gear 423. Since the second rack gear 423 is fixed, the rack 441 moves forward while compressing the elastic unit 447.

When the rack 441 is moved forward, the pinion gear 443 engaged with the rack 441 rotates around the first hinge shaft 443*a* counterclockwise and the rotating portion 61 of the rotating bar 60, engaged with the pinion gear 443, also rotates with the rotating bar 60 around the second hinge shaft 63 counterclockwise, thereby sealing the gap between the first door 31 and the second door 33 as shown in FIG. 23.

When the second door 33 is opened from the state in which both the first door 31 and the second door 33 are closed as shown in FIG. 23, as shown in FIGS. 26 and 27, contact between the protruding portion 39 and the first rack gear 421 is released and the rack 441 is moved backward by the elastic force of the elastic unit 447.

The rack 441 is moved backward and moves the second rack gear 423 backward, and the link 430 engaged with the second rack gear 423 rotates around the rotating shaft 431 clockwise.

The first rack gear 421 engaged with the link 430 is moved forward due to the rotating of the link 430.

Also, when the rack 441 is moved backward, the pinion gear 443 engaged with the rack 441 rotates around the first hinge shaft 443*a* clockwise and the rotating portion 61 of the rotating bar 60, engaged with the pinion gear 443, also rotates with the rotating bar 60 around the second hinge shaft 63 counterclockwise.

Since the rotating bar 60 rotates counterclockwise, the rotating bar 60 moves to a perpendicular position when the second door 33 is opened.

When the second door 33 is closed, an operation of the guide device 400 is performed in a direction opposite to a direction in which the second door 33 is opened in such a way that the rotating bar 60 rotates clockwise. Accordingly, the rotating bar 60 moves to a parallel position to seal the gap between the first door 31 and the second door 33.

As shown in FIGS. 28 and 29, a guide device 500 includes a rack 510 that is moved forward and backward linearly depending on the opening and closing of the second door 33, a latch unit 520 coupled with the rack 510 to be rotatable upward and downward to be held by or released from the holding unit 70, a pinion gear 530 engaged with the rack 510 and rotating when the rack 510 is moved linearly, a guide unit 540 engaged with the pinion gear 530 and moving forward and backward linearly to allow the rotating bar 40 to rotate, a base 550 which accommodates the rack 510, the latch unit 520, the pinion gear 530, and the guide unit 540, and a cover 560 coupled with a top of the base 550.

The holding unit 70 is provided at a rear side of a top of one side of the second door 33 and comes in contact with and pushes the rack 510 backward when the second door 33 is closed.

The holding unit 70 includes a case 71 coupled with the second door 33, a holding groove 73 provided at a top of the case 71 to hold or release the latch unit 520, and a first reinforcing member 75 formed of a steel material reinforcing rigidity of the case 71.

The rack 510 includes a first rack gear 511 engaged with the pinion gear 530 and moved forward and backward linearly in the base 550, a contact portion 512 provided at a front end portion of a bottom of the first rack gear 511 and in contact with the holding unit 70, a supporting portion 513 provided to support a front end portion of the latch unit 520, a magnet accommodating groove 514 provided in the rear of the contact portion 512 to accommodate a magnet M, a first guide rail 515 provided at a top of the first rack gear 511 to guide the rack 510 to be movable forward and backward, and a supporting rib 516 which supports the latch unit 520 to prevent the latch unit 520 from being moved backward after having moved forward (refer to FIG. 31).

The first rack gear 511 is engaged with the pinion gear 530 to allow the pinion gear 530 to rotate when the rack 510 is moved forward and backward linearly.

A pair of coupling holes 517 which guide a pair of coupling protrusions 521 provided at the latch unit 520 are provided at the first rack gear 511 to allow the latch unit 520 to be rotatably coupled with the rack 510.

The contact portion 512 comes in contact with the holding unit 70 when the second door 33 is closed and allows the rack 510 to be moved backward by the holding unit 70.

The supporting portion 513 is provided at a top of the contact portion 512. When the second door 33 is opened, the supporting portion 513 supports a held portion 522 in a state in which the latch unit 520 is released from the holding unit 70 and the held portion 522 is moved upward.

The magnet M is accommodated in the magnet accommodating groove 514 and generates magnetic forces in spaces from the first reinforcing member 75 of the holding unit and a second reinforcing member 527 of the latch unit 520, which are formed of a steel material.

Due to the magnetic force generated between the magnet M and the first reinforcing member 75, the rack 510 may receive a force to be moved forward from the holding unit 70 moved forward when the second door 33 is opened.

Also, due to the magnetic force between the magnet M and the second reinforcing member 527, the latch unit 520 may be moved with the rack 510 in while in contact with the rack 510.

The first guide rail 515 is provided at the top of the first rack gear 511 and a first guide portion 561 having a shape corresponding to the first guide rail 515 is provided at the cover 560 in such a way that the first guide rail 515 moves along the first guide portion 561 to allow the rack 510 to be movable forward and backward.

The supporting rib 516 supports a supporting groove 526 of the latch unit 520 that has moved forward to prevent the latch unit 520 from being moved backward.

When the latch unit 520 is moved forward, the held portion 522 rotates upward and is supported by the supporting portion 513 of the rack 510. Accordingly, since the front end portion is higher than a rear end portion, the latch unit 520 is moved backward. Here, since the supporting rib 516 is supported by the supporting groove 526, the latch unit 520 may be prevented from being moved backward.

The latch unit 520 includes the coupling protrusions 521 accommodated in the pair of coupling holes 517 provided at the rack 510 to allow the latch unit 520 to be coupled with the rack 510, the held portion 522 provided at the front end portion to be held by or released from the holding groove 73 of the holding unit 70, rollers 523 provided at the front end portion to allow the latch unit 520 to be moved forward and backward linearly, a pair of rotating protrusions 524 provided above the rollers 523 to allow the latch unit 520 to rotate upward and downward, a latch unit guide groove 525 provided between the pair of rotating protrusions 524 to guide the latch unit 520 to be moved forward and backward, the supporting groove 526 supported by the supporting rib 516 to prevent the latch unit 520 from being moved backward after having moved forward, and the second reinforcing member 527 formed of a steel material reinforcing the rigidity of the front end portion of the latch unit 520.

The coupling protrusions 521 are provided on the left and right and accommodated in the coupling holes 517 of the rack 510 to prevent the latch unit 520 from being separated from the rack 510 and to allow the latch unit 520 to be moved forward and backward with the rack 510.

The held portion 522 is provided at the front end portion of the latch unit 520. When the second door 33 is closed and the holding unit 70 comes in contact with the contact portion 512 and pushes the rack 510, the held portion 522 rotates downward and is held by the holding groove 73 of the holding unit 70. When the second door 33 is opened and the holding unit 70 is released from the contact with the contact portion 512 of the rack 510, the held portion 522 rotates upward and is released from the holding groove 73.

The rollers 523 are provided at the rear end portion of the latch unit 520 and guided along a third guide rail 555 provided at the base 550 to allow the latch unit 520 to be move forward and backward.

The rotating protrusions 524 are provided at the front end portion of the latch unit 520 and above the rollers 523 and guided by a fourth guide portion 567 provided at the cover 560.

When the latch unit 520 is moved forward and the rotating protrusions 524 come in contact with the fourth guide portion 567, the rotating protrusions 524 are guided by the fourth guide portion 567 to allow the held portion 522 to rotate upward.

The latch unit 520 that has moved forward is moved backward, the rotating protrusions 524 are guided by the fourth guide portion 567 to allow the held portion 522 to rotate downward.

The latch unit guide groove 525 is provided between the pair of rotating protrusions 524 and guided by a third guide portion 565 provided at the cover 560 to allow the latch unit 520 to be moved forward and backward.

The supporting groove 526 is provided at a bottom of the latch unit 520 and supported by the supporting rib 516 provided at the rack 510 to prevent the latch unit 520 from being moved backward when the latch unit 520 is moved forward and the held portion 522 rotates upward.

The pinion gear 530 is provided to be engaged with the first rack gear 511 of the rack 510 and a second rack gear 541 of the guide unit 540 and includes a rotating hole 531.

A rotating shaft 569 provided at the cover 560 is rotatably coupled with rotating hole 531 to allow the pinion gear 530 to rotate around the rotating shaft 569.

Since the pinion gear 530 is provided between the rack 510 and the guide unit 540 to be engaged with the rack 510 and the guide unit 540, the pinion gear 530 rotates around the rotating shaft 569 when the rack 510 is moved forward and backward. Here, when the rack 510 is moved backward, the pinion gear 530 rotates around the rotating shaft 569 counterclockwise to allow the guide unit 540 to be moved forward. When the rack 510 is moved forward, the pinion gear 530 rotates around the rotating shaft 569 clockwise to allow the guide unit 540 to be moved backward.

The guide unit 540 includes the second rack gear 541 engaged with the pinion gear 530 and moved forward and backward linearly in the base 550, a second guide rail 543 which guides the guide unit 540 to be moved forward and backward linearly, and a guide groove 545 which guides the guide protrusion **41*b* provided at the rotating bar 40 and induces the rotating bar 40 to rotate (refer to FIG. 30**).

The second rack gear 541 is engaged with the pinion gear 530 and moved forward and backward linearly by the pinion gear 530 rotating when the rack 510 is moved forward and backward linearly in such a way that the guide unit 540 is moved linearly by the second guide rail 543. Here, the second rack gear 541 is moved linearly in a direction opposite to that of the rack 510.

The second guide rail 543 moves along a second guide portion 563 provided at the cover 560 to allow the guide unit 540 to be moved forward and backward.

The guide groove 545 guides the guide protrusion **41*b* of the rotating bar 40 and induces the rotating bar 40 to rotate (refer to FIG. 30**).

When the guide unit 540 is moved forward and backward linearly, the rotating bar 40 rotates due to the guide protrusion **41*b* guided by the guide groove 545 moved forward and backward. The rotating of the rotating bar 40 according to the movement of the guide unit 540** will be described below.

The base 550 includes a guide hole 551 through which the contact portion 512 of the rack 510 passes to come in contact with the holding unit 70 and which guides the contact portion 512 to allow the rack 510 to move forward and backward linearly, an accommodating portion 553 in which the guide unit 540 is accommodated and moved forward and backward linearly, and the third guide rail 555 which guides the rollers 523 to allow the latch unit 520 to be linearly movable forward and backward.

A rotating groove 557 provided to be dented downward at a position corresponding to the fourth guide portion 567 to guide the rollers 523 when the rotating protrusions 524 of the latch unit 520 are guided by the fourth guide portion 567 of the cover 560 and the latch unit 520 rotates is provided at the third guide rail 555.

The cover 560 is coupled with the top of the base 550. At a bottom of the cover 560, the first guide portion 561 and the second guide portion 563 provided to have shapes corresponding to the first guide rail 515 of the rack 510 and the second guide rail 543 of the guide unit 540 and to allow the rack 510 and the guide unit 540 to be moved forward and backward linearly are provided.

Also, at the bottom of the cover 560, the third guide portion 565 which guides the latch unit guide groove 525 of the latch unit 520 to allow the latch unit 520 to be moved forward and backward linearly and the fourth guide portion 567 which guides the rotating protrusions 524 to allow the latch unit 520 to rotate upward are provided.

Next, referring to FIGS. 30 to 38, an operation of the rotating bar 40 being guided by the guide device 500 to rotate according to the opening and closing of the second door 33 will be described.

As shown in FIG. 30, when both the first door 31 and the second door 33 are closed, the rotating bar 40 rotates to a parallel position to seal the gap between the first door 31 and the second door 33.

Here, as shown in FIG. 31, the holding unit 70 comes in contact with the contact portion of the rack 510 and moves the rack 510 backward and the held portion of the latch unit 520 is moved backward with the rack 510 while being held by the holding groove 73.

When the second door 33 is opened from the state in which both the first door 31 and the second door 33 are closed as shown in FIGS. 32 and 33, since the held portion 522 is held by the holding groove 73, the holding unit 70 moves the latch unit 520 forward while moving forward. When the latch unit 520 is moved forward, the rack 510 coupled with the latch unit 520 is moved forward with the latch unit 520.

Here, since the magnetic force is generated between the first reinforcing member 75 of the holding unit 70 and the magnet M provided at the rack 510, the rack 510 receives the force of being moved forward from the holding unit 70 that is moved forward.

Also, when the rack 510 is moved forward, since the magnetic force is generated between the second reinforcing member 527 provided at the latch unit 520 and the magnet M provided at the rack 510, the latch unit 520 may be moved with rack 510 while remaining in contact with the rack 510.

When the second door 33 is opened and the rack 510 is moved forward, the pinion gear 530 engaged with the first rack gear 511 of the rack 510 rotates around the rotating shaft 569 clockwise and the second rack gear 541 of the guide unit 540, engaged with the pinion gear 530, is moved backward.

When the guide unit 540 is moved backward, the guide protrusion 41*b* is guided by the guide groove 545 to allow the rotating bar 40 to rotate counterclockwise and the rotating bar 40 rotates counterclockwise to the parallel position as shown in FIG. 34.

Here, as shown in FIG. 35, the holding unit 70 is released from the contact with the contact portion 512 of the rack 510, the rotating protrusions 524 of the latch unit 520 being moved forward with the rack 510 are guided by the fourth guide portion 567 to rotate to allow the held portion 522 to face upward, and the held portion 522 is released from the holding groove 73 and is supported by the supporting portion 513 of the rack 510.

When the held portion 522 is supported by the supporting portion 513 in such a way that the held portion 522 of the latch unit 520 rotates upward, the supporting groove 526 of the latch unit 520 is supported by the supporting rib 516, thereby preventing the latch unit 520 from being moved backward.

As shown in FIGS. 36 and 37, when the second door 33 is closed, the holding unit 70 comes in contact with the contact portion 512 of the rack 510 and moves the rack 510 backward.

When the rack 510 is moved backward, as shown in FIG. 38, the held portion 522 supported by the supporting portion 513 rotates to face downward and is held by the holding groove 73.

When the second door 33 is closed while the held portion 522 is held by the holding groove 73, the rack 510 and the latch unit 520 are moved backward by the holding unit 70.

When the rack 510 is moved backward, as shown in FIG. 36, the pinion gear 530 engaged with the first rack gear 511 rotates around the rotating shaft 569 counterclockwise and the second rack gear 541 of the guide unit 540, engaged with the pinion gear 530, is moved forward.

When the guide unit 540 is moved forward, the guide protrusion 41*b* is guided by the guide groove 545 to allow the rotating bar 40 to rotate clockwise and the rotating bar 40 rotates clockwise to the parallel position to seal the gap between the first door 31 and the second door 33 as shown in FIG. 30.

While particular shapes and directions of a refrigerator have been described with reference to the attached drawings, it should be understood that one of ordinary skilled in the art may variously modify and change them and such modifications and changes described will be included within the scope of the present invention.

What is claimed is:

1. A refrigerator comprising:

a body;

a storage compartment provided in the body and having a front side;

a first door including a rotating bar which is moveable between a parallel position and a perpendicular position;

a second door including a first magnet accommodated in a protruding portion provided on an upper rear side of the second door; and a guide assembly provided at the body to guide the rotating bar, the guide assembly including:

a moveable member including a second magnet, the moveable member being configured to move in a first direction which is toward the front side of the storage compartment by a magnetic force between the first magnet and the second magnet as the second door is being opened and to move in a second direction which is away from the front side of the storage compartment by the protruding portion which pushes a contact portion of the moveable member while the second door is being closed, a guide configured to move in the second direction as the moveable member moves in the first direction while the first door is closed so that the guide guides the rotating bar to the perpendicular position and to move in the first direction as the moveable member moves in the second direction while the first door is closed so that the guide guides the rotating bar to the parallel position, and a base having an guide hole along which the moveable member moves in the first direction or the second direction.

2. The refrigerator of claim 1, wherein the protruding portion is positioned below the guide hole and faces the contact portion while the second door is closed.

3. The refrigerator of claim 1, wherein the rotating bar comprises a guide protrusion provided on a top of the rotating bar, and the guide comprises a guide groove which guides the guide protrusion as the guide moves away from or toward the front side of the storage compartment.

4. The refrigerator of claim 3, wherein, when the moveable member moves in the first direction and the guide moves in the second direction, the guide protrusion is guided by the guide groove to allow the rotating bar to move to the perpendicular position.

5. The refrigerator of claim 3, wherein, when the moveable member moves in the second direction and the guide moves in the first direction, the guide protrusion is guided by the guide groove to allow the rotating bar to move to the parallel position.

6. The refrigerator of claim 1, wherein the guide hole is configured to allow the moveable member to move linearly.

7. The refrigerator of claim 1, wherein the rotating bar moves to the parallel position to seal a gap between the first door and the second door.

8. The refrigerator of claim 1, wherein the rotating bar is in a bar shape formed to extend along a height of the first door.

* * * * *